(12) United States Patent
Ito

(10) Patent No.: US 8,623,498 B2
(45) Date of Patent: Jan. 7, 2014

(54) TRANSPARENT ELECTROCONDUCTIVE LAMINATE AND TRANSPARENT TOUCH PANEL

(75) Inventor: Haruhiko Ito, Hino (JP)

(73) Assignee: Teijin Limited, Osaka (JP)

( * ) Notice: Subject to any disclaimer, the term of this patent is extended or adjusted under 35 U.S.C. 154(b) by 518 days.

(21) Appl. No.: 12/739,641

(22) PCT Filed: Oct. 23, 2008

(86) PCT No.: PCT/JP2008/069251
§ 371 (c)(1),
(2), (4) Date: Apr. 23, 2010

(87) PCT Pub. No.: WO2009/054464
PCT Pub. Date: Apr. 30, 2009

(65) Prior Publication Data
US 2010/0260986 A1    Oct. 14, 2010

(30) Foreign Application Priority Data

| Oct. 26, 2007 | (JP) | ................................. 2007-278482 |
| Dec. 17, 2007 | (JP) | ................................. 2007-324566 |
| Dec. 17, 2007 | (JP) | ................................. 2007-324567 |
| Jan. 24, 2008 | (JP) | ................................. 2008-013622 |
| Jan. 24, 2008 | (JP) | ................................. 2008-013623 |

(51) Int. Cl.
*B32B 7/02* (2006.01)

(52) U.S. Cl.
USPC ........... 428/220; 428/212; 428/323; 428/327; 428/330

(58) Field of Classification Search
USPC .................. 428/220, 323, 327, 330, 331, 212
See application file for complete search history.

(56) References Cited

U.S. PATENT DOCUMENTS

| 2003/0156080 A1 | 8/2003 | Koike et al. |
| 2004/0265602 A1 | 12/2004 | Kobayashi et al. |
| 2005/0118922 A1 | 6/2005 | Endo |

FOREIGN PATENT DOCUMENTS

| EP | 1 691 375 A1 | 8/2006 |
| JP | 02-066809 A | 3/1990 |
| JP | 02-129808 A | 5/1990 |
| JP | 3-048605 A | 3/1992 |
| JP | 07-219697 A | 8/1995 |
| JP | 08-192492 A | 7/1996 |
| JP | 2004-255706 A | 9/2004 |
| JP | 2005-182737 A | 7/2005 |
| JP | 2006-058896 A | 3/2006 |
| JP | 2006-190510 A | 7/2006 |
| JP | 2006-206831 A | 8/2006 |
| JP | 2006-244771 A | 9/2006 |
| JP | 2006-252875 A | 9/2006 |
| WO | 2005/073763 A1 | 8/2005 |

*Primary Examiner* — Mark Ruthkosky
*Assistant Examiner* — Lawrence Ferguson
(74) *Attorney, Agent, or Firm* — Sughrue Mion, PLLC

(57) ABSTRACT

A transparent conductive laminate for obtaining a transparent touch panel improved in the durability in writing which has been required of conventional transparent touch panels and in durability in writing in marginal regions of the transparent touch panel (margin pushing durability). Also provided is a transparent touch panel employing the laminate. The transparent conductive laminate comprises a polymer film and, superposed on at least one side thereof in the following order, a cured resin layer, a transparent conductive layer (1), and another transparent conductive layer (2). The transparent conductive layer (1) is a crystalline transparent conductive layer containing no organic ingredient. The transparent conductive layer (2) comprises: an ionizing-radiation-cured resin, thermoplastic resin, polymer of a metal alkoxide other than alkoxysilanes, or thermally cured/crosslinked resin; and at least one kind of fine particles (A) of a conductive metal oxide or metal which have an average primary-particle diameter of 100 nm or smaller.

18 Claims, 2 Drawing Sheets

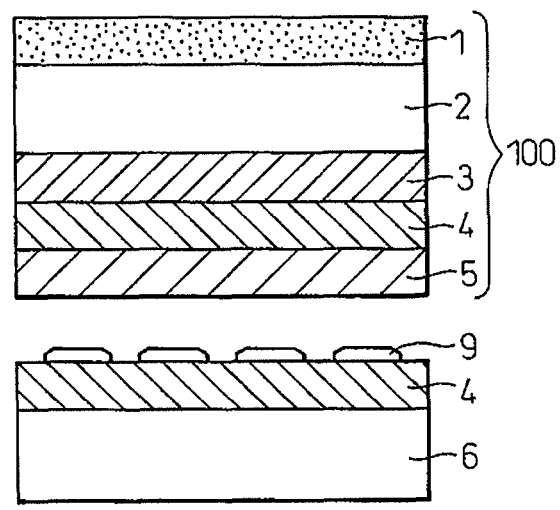
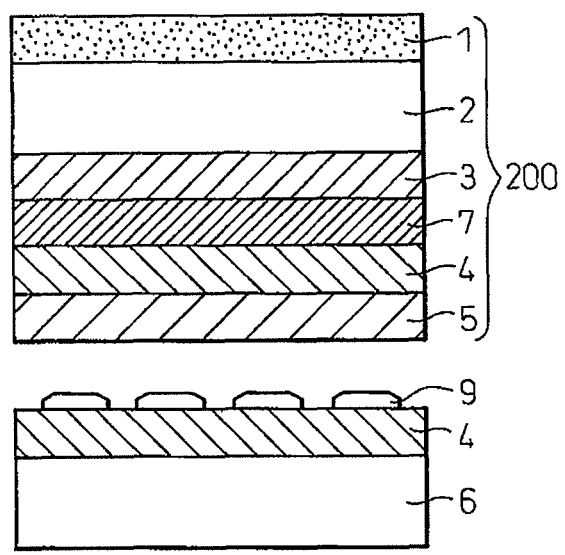

TRANSPARENT ELECTROCONDUCTIVE LAMINATE AND TRANSPARENT TOUCH PANEL

TECHNICAL FIELD

The present invention relates to a transparent electroconductive laminate, and a transparent touch panel having the transparent electroconductive laminate.

BACKGROUND ART

Mobile information terminals equipped with a display and a transparent touch panel as an input device are becoming more common. A resistive transparent touch panel mostly used as the transparent touch panel is configured such that two transparent electrode substrates, each having a transparent electroconductive layer thereon, are disposed so as to have respective transparent electroconductive layers facing to each other with a gap of about 10 to 100 μm therebetween, and thereby the surfaces of transparent electroconductive layers come into contact with each other only at a portion in which external force is applied. This configuration enables the two transparent electrode substrates to work as a switch. In such a touch panel, for example, a menu can be selected and graphics and letters can be written.

Recently, the frame size of a liquid crystal display body or the like is small, and also the frame size of a transparent touch panel small. With this reduction in the frame size, an edge-pressing durability, i.e. writing durability in the edge of the transparent touch panel, has become desirable for a transparent touch panel, in addition to writing durability which is conventionally required.

In order to improve the writing durability which is required for a transparent touch panel, Patent Documents 1 to 3 have proposed a transparent electroconductive laminate fabricated by laminating two transparent polymer films by an adhesive or transparent resin layer having a specific hardness (or Young's modulus). In any of these methods, two transparent polymer films are laminated through an adhesive or a transparent resin layer, and this causes a problem that the production process is complicated and the production efficiency is low, although a writing durability is improved. Moreover, when a large transparent touch panel exceeding 10 inches is produced, the transparent electroconductive laminate is disadvantageously flexed due to structurally low rigidity.

Patent Document 4 has proposed a resistive touch panel capable of mass production and reduction in the production cost, which is a touch panel characterized in that at least one transparent electrode film is formed of a transparent electroconductive polymer material such as thiophene-based electroconductive polymer or polyaniline-based electroconductive polymer. In Patent Document 4, a laminate of an ITO film and a transparent electroconductive polymer film is also proposed. However, for example, a transparent electroconductive laminate using an electroconductive polymer material as the transparent electrode has a problem that contact resistance obtained when transparent electroconductive layers are in contact with each other in the transparent touch panel is large, and therefore the transparent touch panel does not work, or a problem that transmittance and environmental reliability cannot be ensured.

Patent Document 5 has proposed a touch panel wherein an electroconductive fine particle-containing polymer layer is formed on a transparent electrode surface of a transparent substrate, and Patent Document 6 has proposed a technique of forming a metal and/or metal oxide thin film as an electroconductive layer by a vacuum deposition method, an ion plating method or a sputtering method, and then laminating thereon a coating material having electrical conductivity.

In the transparent touch panel using a transparent electroconductive laminate proposed in Patent Documents 4 to 6, a cured resin layer is not provided between the transparent electroconductive layer and the polymer film. Therefore, when a polyethylene terephthalate generally used as a movable electrode substrate of a transparent touch panel is used as the polymer film, oligomer components are disadvantageously mitigated from the polymer film after a heat treatment and the like. Furthermore, since the properties of the transparent electroconductive layer are not specified, there is a problem that when such a transparent electroconductive laminate is used for a transparent touch panel, writing durability necessary for a transparent touch panel cannot be ensured.

Patent Document 1: Japanese Unexamined Patent Publication No. 2-66809
Patent Document 2: Japanese Unexamined Patent Publication No. 2-129808
Patent Document 3: Japanese Unexamined Patent Publication No. 8-192492
Patent Document 4: Japanese Unexamined Patent Publication No. 2005-182737
Patent Document 5: Japanese Unexamined Patent Publication No. 7-219697
Patent Document 6: Japanese Examined Patent Publication No. 3-48605

DISCLOSURE OF THE INVENTION

Problems to be Solved by the Invention

An object of the present invention is to provide a transparent touch panel having an improved writing durability and writing durability in the edge region of a transparent touch panel (edge-pressing durability), which are conventionally required for a transparent touch panel, and to provide a transparent electroconductive laminate suitable for such a transparent touch panel.

Means to Solve the Problems

Generally, in a transparent electroconductive laminate fabricated by forming a transparent electroconductive layer on a transparent polymer substrate via a cured resin layer, the transparent electroconductive layer is subject to a dimensional change due to bending during an edge-pressing durability test or a writing durability test. In the case where the dimensional change of the transparent electroconductive layer due to bending is above a certain level, particularly when the electroconductive layer is elongated, it is known that the transparent electroconductive layer or the cured resin layer below the transparent electroconductive layer cannot withstand the dimensional change (elongation) and allows generation of cracks (microcracks), and thereby the electric properties of the transparent touch panel are deteriorated.

In this regard, the inventors of the present invention have found that a touch panel using the transparent electroconductive laminate of the present invention described below can have an improved edge-pressing durability, and an improved transparency of the electroconductive layer.

The present invention is as follows.

(1) A transparent electroconductive laminate, comprising a polymer film, on at least one surface thereof, a cured resin layer, a transparent electroconductive layer-1 and a transparent electroconductive layer-2 laminated in the order, wherein the transparent electroconductive layer-1 is a crystalline transparent electroconductive layer containing no organic component; and the transparent electroconductive layer-2 contains an ionizing radiation-curable resin, a thermoplastic resin, a polymer of a metal alkoxide other than alkoxysilane, or a thermosetting/crosslinking resin, and at least one fine particle A of electroconductive metal oxide or metal having an average primary particle diameter of 100 nm or less.

(2) The transparent electroconductive laminate as described in (1) above, wherein the content of the fine particle A is from 0.1 to 400 parts by weight per 100 parts by weight of the ionizing radiation-curable resin, the thermoplastic resin, the polymer of a metal alkoxide other than alkoxysilane, or the thermosetting/crosslinking resin.

(3) The transparent electroconductive laminate as described in (1) above, wherein the film thickness of the transparent electroconductive layer-1 is from 5 to 50 nm.

(4) The transparent electroconductive laminate as described in (1) above, wherein the film thickness of the transparent electroconductive layer-2 is from 10 to 1,500 nm.

(5) The transparent electroconductive laminate as described in any one of (1) to (4) above, wherein the transparent electroconductive layer-2 contains a fine particle B having an average primary particle diameter of 1.2 times or more of the film thickness of the transparent electroconductive layer-2 and 1.2 μm or less.

(6) The transparent electroconductive laminate as described in (5) above, wherein the fine particle B is a fine particle of electroconductive metal oxide or metal.

(7) The transparent electroconductive laminate as described in any one of (1) to (6) above, wherein the laminate further comprises a metal oxide layer having a film thickness of 0.5 nm to less than 5.0 nm between the cured resin layer and the transparent electroconductive layer-1.

(8) The transparent electroconductive laminate as described in any one of (1) to (7) above, wherein the cured resin layer has a refractive index of 1.20 to 1.55 and a film thickness of 0.05 to 0.5 μm.

(9) The transparent electroconductive laminate as described in any one of (1) to (8) above, wherein the cured resin layer has an uneven surface, and contains a curable resin component and one, two or more fine particles C having an average primary particle diameter of more than 0.1 μm, and the average primary particle diameter of at least one fine particle C is 1.2 times or more of the film thickness of the cured resin layer.

(10) The transparent electroconductive laminate as described in any one of (1) to (8) above, wherein the cured resin layer has an uneven surface, and contains a curable resin component and one, two or more fine particles D of metal oxide or metal fluoride having an average primary particle diameter of 100 nm or less.

(11) The transparent electroconductive laminate as described in (9) or (10) above, wherein the cured resin layer contains a curable resin component, a fine particle C, and a fine particle D.

(12) The transparent electroconductive laminate as described in any one of (1) to (8) above, wherein the cured resin layer has an uneven surface formed by phase separation of two components, and does not contain a particle for imparting a surface unevenness, the arithmetic average roughness (Ra) according to JIS B0601-1994 of the cured resin layer is from 0.05 μm to less than 0.5 μm, and the ten-point average roughness (Rz) according to JIS B0601-1982 of the cured resin layer is from 0.5 μm to less than 2 μm.

(13) The transparent electroconductive laminate as described in (12) above, wherein the components forming the cured resin layer are a polymer as a first component and a monomer as a second component.

(14) The transparent electroconductive laminate as described in (12) or (13) above, wherein the difference between the SP values of the first and second components forming the cured resin layer is 0.5 or more.

(15) The transparent electroconductive laminate as described in any one of (12) to (14) above, wherein the first component forming the cured resin layer is an unsaturated double bond-containing acrylic copolymer, and the second component is a polyfunctional unsaturated double bond-containing monomer.

(16) The transparent electroconductive laminate as described in any one of (1) to (7) above, wherein the laminate has an optical interference layer comprising at least one low refractive index layer and at least one high refractive index layer between the polymer film and the transparent electroconductive layer-1, and the low refractive index layer is in contact with the transparent electroconductive layer-1.

(17) The transparent electroconductive laminate as described in any one of (1) to (16) above, wherein the laminate has an optical interference layer comprising at least one low refractive index layer and at least one high refractive index layer between the polymer film and the metal oxide layer, and the low refractive index layer is in contact with the metal oxide layer.

(18) A touch panel wherein two transparent electrode substrates each having, on at lease one surface thereof, a transparent electroconductive layer are disposed such that the transparent electroconductive layers face to each other, and wherein the transparent electroconductive laminate described in any one of (1) to (17) above is used as at least one of the transparent electrode substrate.

EFFECTS OF THE INVENTION

According to the present invention, a transparent touch panel having improved writing durability, particularly in the edge region (edge-pressing durability), without deteriorating the optical properties and environmental reliability required for a transparent touch panel, is provided. Further, a transparent electroconductive laminate suitable for such a transparent touch panel is provided.

BRIEF DESCRIPTION OF THE DRAWINGS

FIG. 1 A cross-sectional view schematically illustrating a configuration example of the transparent touch panel of the present invention.

FIG. 2 A cross-sectional view schematically illustrating a configuration example of the transparent touch panel of the present invention.

BEST MODE FOR CARRYING OUT THE INVENTION

Figure 3:
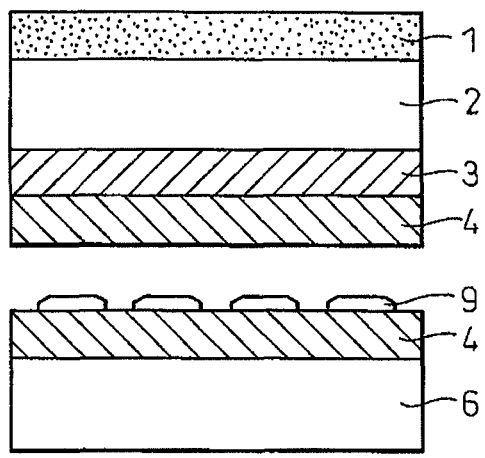
FIG. 3 A cross-sectional view schematically illustrating a configuration example of the conventional transparent touch panel.
Figure 4:
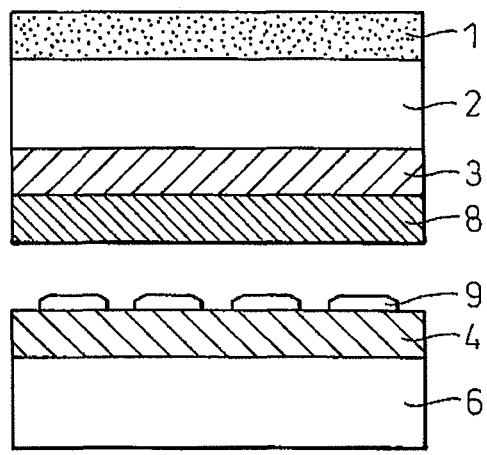
FIG. 4 A cross-sectional view schematically illustrating a configuration example of the conventional transparent touch panel.

The present invention is described in detail below.

The transparent electroconductive laminate of the present invention comprises a polymer film having, on at least one surface thereof, a cured resin layer, a transparent electroconductive layer-1 and a transparent electroconductive layer-2 laminated in the order.

The transparent electroconductive laminate of the present invention has a configuration, for example, denoted by number 100 in FIG. 1. In FIG. 1, a cured resin layer (3) having an uneven surface, a transparent electroconductive layer-1 (4) and a transparent electroconductive layer-2 (5) are laminated on one surface of a polymer film (2). In the transparent electroconductive laminate of the present invention shown in FIG. 1, an optional hardcoat layer (1) is laminated on another surface of the polymer film (2).

Also, the transparent electroconductive laminate of the present invention has a configuration, for example, denoted by number 200 in FIG. 2. In FIG. 2, a cured resin layer (3) having an uneven surface, a metal oxide layer (7), a transparent electroconductive layer-1 (4) and a transparent electroconductive layer-2 (5) are laminated on one surface of a polymer film (2). In the transparent electroconductive laminate of the present invention shown in FIG. 2, an optional hardcoat layer (1) is laminated on another surface of the polymer film (2).

Incidentally, in FIGS. 1 to 4, "1" is a hardcoat layer, "2" is a polymer film, "3" is a cured resin layer, "4" is a transparent electroconductive layer-1, "5" is a transparent electroconductive layer-2, "6" is a glass substrate, "7" is a metal oxide layer, "8" is an electroconductive polymer layer, "9" is a dot spacer, and "100" and "200" are a transparent electroconductive laminate (movable electrode substrate).

<Polymer Film>

The organic polymer constituting the polymer film is not limited, as long as it is a transparent organic polymer having excellent heat resistance. Examples of the organic polymer include a polyester-based resin such as polyethylene terephthalate, polyethylene-2,6-naphthalate and polydiallyl phthalate, a polycarbonate resin, a polyethersulfone resin, a polysulfone resin, a polyarylate resin, an acrylic resin, a cellulose acetate resin, and a cycloolefin polymer. Of course, these may be used as a homopolymer or a copolymer. Also, one of the organic polymers above may be used alone, or a mixture may be used.

The polymer film is suitably formed, for example, by a general melt extrusion method or solution casting method. It is also preferred to uniaxially or biaxially stretch the formed polymer film as needed, and thereby enhance the mechanical strength or optical function.

In the case of using the transparent electroconductive laminate of the present invention as a movable electrode substrate of a transparent touch panel, a polymer film having a thickness of 75 to 400 μm is preferred in view of strength to keep flatness and flexibility to actuate the transparent touch panel as a switch. In the case of using the transparent electroconductive laminate of the present invention as a fixed electrode substrate, a sheet-shaped polymer film having a thickness of 0.4 to 4.0 mm is preferred in view of strength to keep the flatness. However, in use as a fixed electrode substrate, the transparent electroconductive laminate of the present invention may be used in a configuration wherein a polymer film having a thickness of 50 to 400 μm is laminated to another plastic sheet resulting in a thickness of 0.4 to 4.0 mm.

In the case of using the transparent electroconductive laminate of the present invention as a movable electrode substrate of a transparent touch panel, a laminate obtained by forming a transparent electroconductive layer on a plastic sheet described above, on a glass substrate, on a laminate of a polymer film and a glass substrate, or on a laminate of a polymer film and a plastic sheet may be used as the fixed electrode substrate. In view of strength and weight of the transparent touch panel, the thickness of the fixed electrode substrate composed of a single layer or a laminated layers is preferably from 0.1 to 4.0 mm.

In recent years, a new transparent touch panel has been developed, wherein a polarizing plate or a combination of polarizing plate and retardation film are laminated on the input side, i.e. the user side, of a transparent touch panel. This configuration is advantageous in that the reflectance of extraneous light in the inside of the transparent touch panel is reduced to a half or less mainly by the optical action of the polarizing plate or the combination of polarizing plate and retardation film, and thereby the contrast of a display having a transparent touch panel is enhanced.

In this type of transparent touch panel, the polarized light passes through the transparent electroconductive laminate, and therefore the polymer film used preferably has excellent optical isotropy. More specifically, assuming that the refractive index in the slow axis direction of the film is $n_x$, the refractive index in the fast axis direction is $n_y$ and the thickness of the film is d (nm), the in-plane retardation value Re represented by the formula $Re=(n_x-n_y) \times d$ (nm) is preferably 30 nm or less, more preferably 20 nm or less. The in-plane retardation value of the substrate is represented by the value measured using by a spectral ellipsometer (M-150 manufactured by JASCO Corporation) at a wavelength of 590 nm.

In the usage of a transparent touch panel of the type illustrated above wherein polarized light passes through the transparent electroconductive laminate, the in-plane retardation value of the transparent electrode substrate is very important. In addition, the three-dimensional refractive index property of the transparent electrode substrate, i.e., the K value represented by the formula $K=\{(n_x+n_y)/2-n_z\} \times d$ ($n_z$ is the refractive index in the film thickness direction of the substrate), is preferably from −250 to +150 nm, and more preferably from −200 to +100 nm in view of excellent viewing angle property of the transparent touch panel.

Examples of the polymer film excellent in the optical isotropy include a formed substrate of a polycarbonate, an amorphous polyarylate, a polyethersulfone, a polysulfone, a triacetyl cellulose, a diacetyl cellulose, a cycloolefin polymer, or their modified product or copolymer with a different material; a formed substrate of a thermosetting resin such as epoxy-based resin; and a formed substrate of an ionizing radiation-curing resin such as acrylic resin. In view of shapability, production cost, thermal stability and the like, a formed substrate of, for example, a polycarbonate, an amorphous polyarylate, a polyethersulfone, a polysulfone, a cycloolefin polymer, or their modified product or copolymer with a different material is most preferred.

More specifically, examples of the polycarbonate formed substrate which is preferably used include a formed substrate of a polycarbonate having an average molecular weight of approximately from 15,000 to 100,000 (examples of the commercial product include "Panlite" produced by Teijin Chemicals Ltd., and "Apec HT" produced by Bayer), which is a polymer or copolymer having at least one monomer unit selected from the group consisting of bisphenol A, 1,1-di-(4-phenol)cyclohexylidene, 3,3,5-trimethyl-1,1-di(4-phenol) cyclohexylidene, fluorene-9,9-di(4-phenol) and fluorene-9, 9-di(3-methyl-4-phenol), or a mixture of polymers or copolymers comprising at least one above monomer unit.

Examples of the amorphous polyarylate formed substrate include formed substrates of "ELMECH" produced by Kaneka Corporation, "U-Polymer" produced by Unitika Ltd., and "Isaryl" produced by Isonova.

Examples of the cycloolefin polymer formed substrate include formed substrates of "ZEONOR" produced by ZEON Corporation, and "ARTON" produced by JSR.

Examples of the forming method of such a polymer material include a melt extrusion method, a solution casting method and an injection molding method, but from the standpoint of obtaining excellent optical isotropy, the polymer material is preferably formed by a solution casting method or a melt extrusion method.

<Transparent Electroconductive Layer-1>

In the present invention, the transparent electroconductive layer-1 is a crystalline electroconductive layer containing no organic component, and examples thereof include a crystalline metal layer and a crystalline metal compound layer.

Incidentally, "containing no organic component" as used regarding the present invention means to not contain an organic component in an amount of more than 0.5 wt %. Examples of the component constituting the transparent electroconductive layer-1 include a metal oxide such as silicon oxide, aluminum oxide, titanium oxide, magnesium oxide, zinc oxide, indium oxide and tin oxide. Among these, metal oxide layers of indium oxide and/or tin oxide are preferred.

Furthermore, the transparent electroconductive layer-1 is preferably a crystalline film comprising indium oxide as the main component, and a layer composed of crystalline ITO (indium tin oxide) is particularly preferred.

The upper limit of the crystal grain size need not be particularly limited, but is preferably 3,000 nm or less. If the crystal grain size exceeds 3,000 nm, the writing durability deteriorates and this is not preferred. The crystal grain size as used herein is defined as a maximum size of diagonals or diameters in respective polygonal or oval regions observed under a transmission electron microscope (TEM).

The expression "comprising indium oxide as the main component" as used regarding the present invention means indium oxide containing, as a dopant, tin, tellurium, cadmium, molybdenum, tungsten, fluorine, zinc or the like, or indium oxide containing, as a dopant, silicon, titanium, zinc or the like in addition to tin.

Also, the term "crystalline film" means that a crystal phase occupies 50% or more, preferably 75% or more, more preferably 95% or more, still more preferably almost 100%, in the layer composed of indium oxide containing a dopant.

The transparent electroconductive layer-1 can be formed by a known method, and, for example, a physical forming method (physical vapor deposition; hereinafter referred to as "PVD") such as DC magnetron sputtering method, RF (radio frequency) magnetron sputtering method, ion plating method, vacuum deposition method and pulsed laser deposition method may be used. Considering industrial productivity of forming a metal compound layer having a uniform film thickness for a large area, a DC magnetron sputtering method is preferred. Incidentally, a chemical forming method such as chemical vapor deposition (hereinafter referred to as "CVD") and sol-gel method may also be used, other than the above-described physical forming method (PVD). However, a sputtering method is still preferred in view of control of the film thickness.

The film thickness of the transparent electroconductive layer-1 is, in consideration of transparency and electrical conductivity, preferably from 5 to 50 nm, more preferably from 5 to 30 nm. If the film thickness of the transparent electroconductive layer-1 is less than 5 nm, the resistance value tends to be poorly stable with aging, while if it exceeds 50 nm, the surface resistance value lowers and this is not preferred for a touch panel.

In the case of using the transparent electroconductive laminate of the present invention for a transparent touch panel, from the standpoint of reduction in the power consumption of the transparent touch panel or requirement in the circuit processing, a transparent electroconductive layer ensuring that the surface resistance value of the transparent electroconductive layer-1 is from 100 to 2,000 Ω/square (Ω/sq), more preferably from 140 to 1,000 Ω/square (Ω/sq), with a thickness of 10 to 30 nm, is preferably used.

The transparent electroconductive layer-1 used in the present invention must be a crystalline film. If the transparent electroconductive layer-1 is a crystalline film, it can be superior to other transparent electroconductive layers in terms of environmental reliability, and adherence between a polymer film as the substrate and the transparent electroconductive layer-1. As a result, when the transparent electroconductive laminate of the present invention is used for a transparent touch panel, the environmental reliability required for a transparent touch panel and the writing durability of the transparent touch panel are greatly improved.

(Transparent Electroconductive Layer-2)

The transparent electroconductive layer-2 used in the present invention contains an ionizing radiation-curable resin, a thermoplastic resin, a polymer of a metal alkoxide other than alkoxysilane, or a thermosetting/crosslinking resin, and at least one fine particle A of electroconductive metal oxide or metal having an average primary particle diameter of 100 nm or less.

The film thickness of the transparent electroconductive layer-2 is preferably from 10 to 1,500 nm, more preferably from 50 to 1,000 nm, even more preferably from 100 to 1,000 nm. If the film thickness is less than 5 nm, when the transparent electroconductive laminate of the present invention is used as a transparent electroconductive layer for a touch panel, the edge-pressing durability can be hardly improved. On the other hand, if the film thickness exceeds 1,500 nm, when oppositely disposed transparent electroconductive layers in a transparent touch panel are contacted with each other, the contact resistance is extremely large and this makes it difficult for the transparent touch panel to work.

<Transparent Electroconductive Layer-2 (Ionizing Radiation-Curable Resin)>

In the present invention, the transparent electroconductive layer-2 may be formed from a coating material containing an ionizing radiation-curable resin (a resin that is curable with at least electron beam or ultraviolet ray irradiation) and a fine particle A. More specifically, the coating material may contain a photopolymerizable prepolymer, a photopolymerizable monomer, a photopolymerization initiator and a fine particle A. If desired, the coating material may further contain an additive such as sensitizer, non-reactive resin and leveling agent, and a solvent.

As for the photopolymerizable prepolymer, the structure and molecular weight thereof have an effect on curing of the ionizing radiation-curable coating material, and determine the properties of the ionizing radiation-curable resin, such as adhesion, hardness and crack resistance. The photopolymerizable prepolymer is radical polymerized when an acryloyl group introduced into the skeleton is irradiated with ionizing radiation. A prepolymer that is cured by radical polymerization is particularly preferred because of a high curing rate and a high possibility of the resin design.

The photopolymerizable prepolymer is preferably an acrylic prepolymer having an acryloyl group, and this is a prepolymer having two or more acryloyl groups in one molecule and forms a three-dimensional network structure.

Examples of the acrylic prepolymer which can be used include urethane acrylate, epoxy acrylate, melamine acrylate and polyester acrylate.

The photopolymerizable monomer is used for diluting the high-viscosity photopolymerizable prepolymer to decrease the viscosity and to enhance the workability. Further, it is used, as a crosslinking agent, to strengthen the transparent electroconductive layer-2.

Examples of the monomer giving the ionizing radiation-curable resin include a monofunctional or polyfunctional acrylate such as polyol acrylate, polyester acrylate, urethane acrylate, epoxy acrylate, modified styrene acrylate, melamine acrylate, and silicon-containing acrylate.

Specific examples of the monomer include a polyfunctional monomer such as trimethylolpropane trimethacrylate, trimethylolpropane ethylene oxide-modified acrylate, trimethylolpropane propylene oxide-modified acrylate, isocyanuric acid alkylene oxide-modified acrylate, pentaerythritol triacrylate, dipentaerythritol hexaacrylate, dimethyloltricyclodecane diacrylate, tripropylene glycol triacrylate, diethylene glycol diacrylate, 1,6-hexanediol diacrylate, epoxy-modified acrylate, urethane-modified acrylate and epoxy-modified acrylate. One of these may be used, and two or more thereof may be used in combination.

Also, when a large amount of a photopolymerizable monomer mixed is used, the transparent electroconductive layer-2 becomes harder than necessary. Therefore, the mixing ratio may be appropriately selected so that desired hardness or desired flexibility can be obtained. For example, in the case of using the transparent electroconductive laminate of the present invention for applications requiring to bend the laminate, such as for application for touch panel, the hardness can be adjusted by mixing a non-reactive resin having a good flexibility, such as thermosetting, thermoplastic acrylic resin and epoxy resin.

The photopolymerization initiator is added for starting the reaction of an acryloyl group in a short time and accelerating the reaction upon irradiation with ionizing radiation, and has a catalytic action. The photopolymerization initiator is required particularly when the curing is performed by ultraviolet irradiation, and is sometimes not required when a high-energy electron beam is irradiated. The type of the photopolymerization initiator includes a type that initiates radical polymerization by undergoing cleavage, a type that initiates radical polymerization by abstracting hydrogen, and a type that initiates cationic polymerization by generating an ion.

As the photopolymerization initiator, for example, a radical photopolymerization initiator such as benzoin ether-based, ketal-based, acetophenone-based and thioxanthone-based initiators; and a complex-type cationic photopolymerization initiator such as diazonium salt, diaryliodonium salt and triarylsulfonium salt can be used. One of these may be used, and two or more thereof may be used in combination. The photopolymerization initiator is used by adding it, for example, in an amount of 2 to 10 wt %, preferably from 3 to 6 wt %, based on the solid content of the resin.

For curing the ionizing radiation-curable coating material, an electron beam or an ultraviolet ray is irradiated. In the case of irradiating an electron beam, an electron beam having a wavelength of 100 nm or less, and an accelerating voltage energy of 1,000 keV or less and preferably 100 to 300 keV can be irradiated by using a scanning or curtain-type electron beam accelerator. In the case of irradiating an ultraviolet ray, an ultraviolet ray having a wavelength of 100 to 400 nm and preferably from 200 to 400 nm, and an energy of 50 to 300 kcal/mol is irradiated by using an ultrahigh-pressure mercury lamp, a high-pressure mercury lamp, a low-pressure mercury lamp, a carbon arc, a metal halide lamp or the like.

The ionizing radiation-curable resin is usually dissolved in an appropriate organic solvent, and the diluted coating solution is coated on the transparent electroconductive layer-1. The coating layer formed on the transparent electroconductive layer-1 is cured by irradiating an ionizing radiation.

The organic solvent is preferably an alcohol-based or hydrocarbon-based solvent, such as ethanol, isopropyl alcohol, butanol, 1-methoxy-2-propanol, hexane, cyclohexane and ligroin. Other than these, a polar solvent such as xylene, toluene, cyclohexanone, methyl isobutyl ketone and isobutyl acetate can be also used. One of these solvents may be used alone, and two or more thereof may be used as a mixed solvent.

In the coating process, a method using a known coating machine such as doctor knife, bar coater, gravure roll coater, curtain coater, knife coater and spin coater; a spraying method; a dipping method; and the like are used.

<Transparent Electroconductive Layer-2 (Thermoplastic Resin)>

Examples of the thermoplastic resin used in the transparent electroconductive layer-2 include a polyester-based resin, a polyamide resin, a polyimide resin, a polyether-based resin, a polycarbonate-based resin, a polyvinyl-based resin and a polyolefin-based resin.

One of these thermoplastic resins may be used alone, and two or more resins may be used. However, in the case of using two or more thermoplastic resins, resins of the same type are preferable. As for the thermoplastic resin, any resin synthesized by a known method may be used.

The transparent electroconductive layer-2 used in the present invention may be formed in accordance with a conventionally known method or a method accumulated in this art. For example, a coating solution containing a thermoplastic resin and a fine particle A, such as aqueous solution or water dispersion, is coated on a surface of the transparent electroconductive layer-1 and dried, whereby the layer can be formed.

Alternatively, a coating solution containing a thermoplastic resin, a fine particle A and a solvent is coated on a surface of the transparent electroconductive layer-1, and the solvent is evaporated under heating, whereby the layer can be formed.

Furthermore, the transparent electroconductive layer-2 may be obtained by extruding a thermoplastic resin on a surface of the transparent electroconductive layer-1, or by co-extruding and laminating a polymer resin material constituting the polymer film and a thermoplastic resin layer containing a fine particle A.

Among these methods, a method of using a coating solution such as aqueous solution or water dispersion is preferred, because a thin transparent electroconductive layer-2 can be safely formed.

The coating method is not particularly limited, but examples thereof include a roll coating method and a die coating method.

<Transparent Electroconductive Layer-2 (Polymer of Metal Alkoxide Other than Alkoxysilane)>

The metal alkoxide other than alkoxysilane, which is used in the transparent electroconductive layer-2, is a compound represented by the following formula:

$$(R^3O)_n MR^4_{m-n}$$

In formula above, examples of each of $R^3$ and $R^4$ include a methyl group, an ethyl group, a normal propyl group, an isopropyl group, a normal butyl group, an isobutyl group and acetoxy group, and M represents a metal element and is preferably Al, Ti or Zr. Also, m represents a valence of the metal element M, n represents the number of alkoxy groups added to the metal element M, and n is a number equal to or smaller than m. Among these compounds, a substance capable of hydrolysis is preferred.

Examples of the metal alkoxide include a titanium alkoxide and a zirconium alkoxide.

Examples of the titanium alkoxide include titanium tetraisopropoxide, tetra-n-propyl orthotitanate, titanium tetra-n-butoxide, and tetrakis(2-ethylhexyloxy)titanate. Examples of the zirconium alkoxide include zirconium tetraisopropoxide and zirconium tetra-n-butoxide.

In order to allow the hydrolysis/condensation of the metal alkoxide other than alkoxysilane to proceed efficiently, a catalyst is necessary. As the catalyst, an acidic catalyst or a basic catalyst can be used. Suitable examples of the acidic catalyst include an inorganic acid such as acetic acid, hydrochloric acid and nitric acid; and an organic acid such as acetic acid, citric acid, propionic acid, oxalic acid and p-toluenesulfonic acid. Suitable examples of the basic catalyst include an organic amine compound such as ammonia, triethylamine and tripropylamine; and an alkali metal compound such as sodium methoxide, potassium methoxide, potassium ethoxide, sodium hydroxide and potassium hydroxide.

For obtaining the transparent electroconductive layer-2, a coating composition containing a metal alkoxide other than alkoxysilane and at least one fine particle A having an average primary particle diameter of 100 nm or less, which is composed of a fine particle of electroconductive metal oxide or metal, may be used. Examples of the solvent used in the coating composition include aromatic hydrocarbons such as benzene, toluene and xylene; esters such as ethyl acetate, butyl acetate and isobutyl acetate; ketones such as methyl ethyl ketone and methyl isobutyl ketone; ethers such as tetrahydrofuran; and alcohols such as methanol, ethanol, isopropyl alcohol, n-butanol and propylene glycol. Among these, alcohols, ketones, ethers and esters are preferred.

Generally, for allowing hydrolysis/condensation of alkoxysilane to proceed efficiently, an appropriate heating treatment is necessary, and a heating treatment is preferably applied at a temperature of 100° C. or more for several minutes or more in the coating process.

In the coating process, a method using a known coating machine such as doctor knife, bar coater, gravure roll coater, curtain coater, knife coater and spin coater; a spraying method; a dipping method; and the like are used.

<Transparent Electroconductive Layer-2 (Thermosetting/Crosslinking Resin Component>

In the present invention, the thermosetting/crosslinking resin component constituting the transparent electroconductive layer-2 includes known thermosetting resins such as organosilane-based thermosetting resin, melamine-based thermosetting resin, isocyanate-based thermosetting resin, phenol-based thermosetting resin, epoxy-based thermosetting resin, xylene resin, furan resin, and cyanic acid ester resin. Out of these thermosetting resins, an organosilane-based thermosetting resin using a silane compound (e.g., methyltriethoxysilane, phenyltriethoxysilane) as a monomer, and a melamine-based thermosetting resin using an etherified methylolmelamine or the like as a monomer are preferred, because these resins can be cured at a low temperature in a short time.

One of these thermosetting resins may be used alone, or a plurality thereof may be used in combination. Furthermore, a thermoplastic resin may be mixed, if desired. Incidentally, in the case of performing crosslinking of the resin layer by applying heat, an appropriate amount of a known reaction accelerator or curing agent can be added.

In the present invention, the organosilane-based thermosetting resin used as the thermosetting/crosslinking resin component is obtained, for example, from a curing composition mainly composed of a component that is obtained by reacting an organosilane and/or condensation product thereof with a polyvalent carboxylic acid anhydride, and the organosilane and/or condensation product thereof are produced by hydrolysis of an amino group-containing alkoxysilane.

The amino group-containing alkoxysilane includes an amino group-containing alkoxysilane represented by the formula: $R_n Si(OR')_{4-n}$, wherein R and R' each represents hydrogen or an organic group.

In the present invention, preferred examples of the melamine-based thermosetting resin used as the thermosetting/crosslinking resin component include a methylolmelamine derivative obtained by condensing melamine and formaldehyde; a compound obtained by alkyletherifying the derivative above with a lower alcohol such as methyl alcohol, ethyl alcohol or isopropyl alcohol; and a mixture thereof. Specifically, examples of the methylolmelamine-based derivative include monomethylolmelamine, dimethylolmelamine, trimethylolmelamine, tetramethylolmelamine, pentamethylolmelamine and hexamethylolmelamine.

In the present invention, examples of the isocyanate-based thermosetting resin used as the thermosetting/crosslinking resin component include an adduct of a polyisocyanate compound with a polyhydric alcohol and/or a low molecular weight polyester resin, a cyclopolymer of polyisocyanate compounds with each other, and an isocyanate/biuret compound. Examples of the polyisocyanate compound include tolylene diisocyanate, 4,4-diphenylmethane diisocyanate, 1,5-naphthalene diisocyanate, triphenylmethane triisocyanate, trizine diisocyanate, xylene diisocyanate, lysine diisocyanate, trimethylhexamethylene diisocyanate, dimeric acid diisocyanate, hexamethylene diisocyanate, dicyclohexylmethane diisocyanate and isophorone diisocyanate. Among them, for example, an aliphatic polyisocyanate compound such as hexamethylene diisocyanate and isophorone diisocyanate; an adduct of an aliphatic polyisocyanate compound with a polyhydric alcohol and a low molecular polyester resin; and a cyclopolymer of aliphatic polyisocyanate compounds with each other are preferred.

In the present invention, the phenol-based thermosetting resin used as the thermosetting/crosslinking resin component includes a known phenolic resin, such as novolak-type phenolic resin and cresol-type phenolic resin. Examples thereof include a resin composed of a phenol; an alkyl-substituted phenol such as cresol, p-tert-butylphenol, nonylphenol and p-phenylphenol; a cyclic alkyl-modified phenol such as terpene and dicyclopentadiene; a phenol having a heteroatom-containing functional group such as nitro group, halogen group, cyano group and amino group; a phenol having a skeleton such as naphthalene and anthracene; and a polyfunctional phenol such as bisphenol F, bisphenol A, bisphenol S, resorcinol and pyrogallol.

In the present invention, the epoxy-based thermosetting resin used as the thermosetting/crosslinking resin component may be a polyepoxy compound having two or more epoxy groups in the molecule, or a monoepoxy compound. However, a thermosetting resin containing a polyepoxy compound is preferred.

Examples of the polyepoxy compound include a trifunctional or greater polyepoxy compound such as sorbitol polyglycidyl ether, polyglycerol polyglycidyl ether, pentaerythritol polyglycidyl ether, diglycerol polyglycidyl ether, triglycidyl tris(2-hydroxyethyl) isocyanurate, glycerol polyglycidyl ether, trimethylolpropane polyglycidyl ether, N,N,N',N'-tetraglycidyl methaxylylenediamine, N,N,N',N'-tetraglycidyl-4,4'-diaminodiphenylmethane and N,N,N',N'-tetraglycidyl-1,3-bisaminomethylcyclohexane; and a diepoxy compound such as neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compound include allyl glycidyl ether, 2-ethylhexyl glycidyl ether and phenyl glycidyl ether. Among these, N,N,N',N'-tetraglycidyl methaxylylenediamine, N,N,N',N'-tetraglycidyl-4,4'-diaminodiphenylmethane and N,N,N',N'-tetraglycidyl-1,3-bisaminomethylcyclohexane are preferred.

The thermosetting/crosslinking resin component is usually dissolved in an appropriate organic solvent, and the diluted coating solution is coated on the transparent electroconductive layer-1. The coating layer formed on the transparent electroconductive layer-1 is subjected to a heat treatment, whereby curing proceeds. The heat treatment varies depending on the thermosetting/crosslinking resin component used in the coating process, but a heat treatment at a temperature of 100° C. or more for several minutes is preferably applied. Also, depending on the case, the degree of crosslinking can be more increased by irradiating the coating layer with an actinic ray such as ultraviolet ray, along with the heat treatment above.

The organic solvent is preferably an alcohol-based or hydrocarbon-based solvent, such as ethanol, isopropyl alcohol, butanol, 1-methoxy-2-propanol, hexane, cyclohexane and ligroin. Other than these, a polar solvent such as xylene, toluene, cyclohexanone, methyl isobutyl ketone and isobutyl acetate can also be used. One of these solvents may be used alone, and two or more thereof may be used as a mixed solvent.

In the coating process, a method using a known coating machine such as doctor knife, bar coater, gravure roll coater, curtain coater, knife coater and spin coater; a spraying method; a dipping method; and the like are used.

<Transparent Electroconductive Layer-2 (Fine Particle A)>

In the transparent electroconductive layer-2 used in the present invention, an ionizing radiation-curable resin, a thermoplastic resin, a polymer of a metal alkoxide other than alkoxysilane, or a thermosetting/crosslinking resin; and at least one fine particle A of electroconductive metal oxide or metal having an average primary particle diameter of 100 nm or less are required as components.

In the case where the fine particle A is a metal oxide, examples of the metal oxide include indium oxide, tin dioxide, zinc oxide, cadmium oxide, cadmium/indium oxide (Cd/In$_2$O$_4$), cadmium stannate (Cd$_2$SnO$_4$), zinc stannate (Zn$_2$SnO$_4$) and indium oxide. Among these, metal oxides of indium oxide and/or tin oxide are preferred.

In the case where the fine particle A is a fine metal particle, the fine particle is not particularly limited, as long as it is a metal-based fine particle of metal or alloy, and the metal-based particle can be appropriately selected according to the purpose. The metal constituting the fine metal particle is not particularly limited, and can be appropriately selected according to the purpose. The metal may be a metal itself or may be a metal chalcogenide, a metal halogen compound or the like. Examples of the metal include Ti, Fe, Co, Ni, Zr, Mo, Ru, Rh, Ag, Cd, Sn, Ir, Pt, Au, Pb, Bi and an alloy thereof.

The alloy is not particularly limited, and can be appropriately selected according to the purpose. Examples thereof include an alloy of a metal exemplified as the metal above and one selected from Sc, Y, Ti, Zr, V, Nb, Fe, Co, Ni, Ru, Rh, Pd, Os, Ir, a lanthanoid series element and an actinoid series element.

The average primary particle diameter of the fine particle A needs to be 100 nm or less, and is preferably 75 nm or less, more preferably 50 nm. If the average particle diameter of the fine particle A exceeds 100 nm, the obtained transparent electroconductive layer is whitened, and therefore the transparency of the transparent touch panel is disadvantageously impaired.

The content of the fine particle A in the transparent electroconductive layer-2 is preferably from 0.1 to 400 parts by weight, more preferably from 0.5 to 200 parts by weight, still more preferably from 0.5 to 100 parts by weight, per 100 parts by weight of the ionizing radiation-curable resin, thermoplastic resin, polymer of a metal alkoxide other than alkoxysilane, or thermosetting/crosslinking resin.

If the content of the fine particle A is less than 0.1 parts by weight per 100 parts by weight of the ionizing radiation-curable resin, thermoplastic resin, polymer of a metal alkoxide other than alkoxysilane, or thermosetting/crosslinking resin, the contact resistance becomes large when oppositely disposed two transparent electroconductive layers in a transparent touch panel are contacted with each other, and this makes it difficult for the transparent touch panel to work. On the other hand, if the content of the fine particle A exceeds 400 parts by weight per 100 parts by weight of the ionizing radiation-curable resin, thermoplastic resin, polymer of a metal alkoxide other than alkoxysilane, or thermosetting/crosslinking resin, the transparent electroconductive layer-2 can hardly retain its film strength, and therefore it becomes difficult to ensure the writing durability and the like which are required for a transparent touch panel.

<Transparent Electroconductive Layer-2 (Fine Particle B)>

In the case where surfaces of two transparent electroconductive layers disposed to face to one another in a touch panel are substantially flat (even), when the oppositely disposed two transparent electroconductive surfaces are contacted, there arises a problem that surfaces of two transparent electroconductive layers are sticked to each other to deteriorate the transparent electroconductive layer and to cause mulfunction of the transparent touch panel. In order to prevent this sticking phenomenon between surfaces of two transparent electroconductive layer, a fine particle B may be incorporated into the transparent electroconductive layer-2.

Also, even when the surface of the transparent electroconductive layer is not substantially flat, a fine particle B may be incorporated into the transparent electroconductive layer-2 for the purpose of improving the slipperiness of the surface of the transparent electroconductive layer.

The average primary particle diameter of the fine particle B is preferably 1.2 times or more of the film thickness of the transparent electroconductive layer-2, and 1.2 µm or less. If the average primary particle diameter of the fine particle B is less than 1.2 times of the film thickness of the transparent electroconductive layer-2, the surface of the transparent electroconductive layer-2 can be hardly roughened, and it becomes difficult to prevent a sticking phenomenon between surfaces of two transparent electroconductive layers in a touch panel. On the other hand, if the average particle diameter of the fine particle B exceeds 1.2 µm, the average primary particle diameter of the fine particle B is extremely large in comparison with the film thickness of the transparent electroconductive layer-2, and therefore the fine particle B readily drops off from the transparent electroconductive layer-2, making it difficult to ensure the reliability, such as writing durability required for a touch panel.

The content of the fine particle B in the transparent electroconductive layer-2 is preferably 2.5 parts by weight or less, more preferably 1.5 parts by weight or less, assuming that the total of the ionizing radiation-curable resin, the thermoplastic resin, the polymer of a metal alkoxide other than alkoxysilane or the thermosetting/crosslinking resin and the fine particle A, which constitute the transparent electroconductive layer-2, is 100 parts by weight. When the content of the fine particle B is 2.5 parts by weight or less, a transparent electroconductive layer free of white turbidity can be obtained without impairing the effect of inhibiting a transparent touch panel from malfunctioning due to a sticking phenomenon between surfaces of two transparent electroconductive layers disposed to face one another in the touch panel. In the case of excessively incorporating the fine particle A into the transparent electroconductive layer, the fine particle A may readily drop off from the transparent electroconductive layer, or the adherence to the transparent electroconductive layer-1 may deteriorate to impair the reliability of writing durability required for a touch panel.

The fine particle B is not particularly limited in its components, as long as it is a fine particle having an average primary particle diameter in the range above, and may be appropriately selected according to the purpose. Examples of this fine particle B include fine particles of inorganic compound, organic compound, metal oxide, and metal.

The fine particle B is preferably a fine particle of electroconductive metal oxide or metal. In this case, not only a sticking phenomenon between surfaces of oppositely disposed two transparent electroconductive layers in a transparent touch panel can be prevented, but also deterioration of contact resistance upon the contact of surfaces of two transparent electroconductive layers can be prevented. In this case, the average primary particle diameter of the fine particle B needs to be distinctly larger than the average primary particle diameter of the fine particle A having an average primary particle diameter of 100 nm or less, the fine particle A being blended so as to improve electrical conductivity of the transparent electroconductive layer-2.

In the case where the fine particle B is an electroconductive metal oxide, examples of the fine particle B include a fine metal oxide particle, such as silicon oxide, aluminum oxide, titanium oxide, magnesium oxide, zinc oxide, indium oxide and tin oxide. Among these fine metal oxide particles, fine particles of indium oxide and/or tin oxide are preferred.

In the case where the fine particle B is a fine particle of metal, preferred examples of the metal include Ti, Fe, Co, Ni, Zr, Mo, Ru, Rh, Ag, Cd, Sn, Ir, Pt, Au, Pb, Bi and an alloy thereof.

<Metal Oxide Layer>

The transparent electroconductive laminate of the present invention may further has a metal oxide layer having a film thickness of 0.5 nm to less than 5.0 nm, between the polymer film and the transparent electroconductive layer-1.

A polymer film, a metal oxide film having a controlled film thickness, and a transparent electroconductive layer-1 are laminated in the order, whereby adherence between respective layers is greatly improved. A transparent touch panel using such a transparent electroconductive laminate is further enhanced in the writing durability recently required for a transparent touch panel, as compared with that having no metal oxide layer. If the film thickness of the metal oxide layer is 5.0 nm or more, the metal oxide layer has a mechanical property of a continuous body, and therefore the edge-pressing durability required for the transparent touch panel may not be enhanced. On the other hand, if the film thickness is less than 0.5 nm, in addition that control of the film thickness is difficult, the adherence between the polymer film and the transparent electroconductive layer-1 can be hardly improved, and therefore the writing durability required for the transparent touch panel may not be sufficiently improved.

Examples of the component constituting the metal oxide layer include a metal oxide, such as silicon oxide, aluminum oxide, titanium oxide, magnesium oxide, zinc oxide, indium oxide and tin oxide.

Such a metal oxide layer can be formed by a known method, and, for example, a physical forming method (physical vapor deposition; hereinafter referred to as "PVD") such as DC magnetron sputtering method, RF magnetron sputtering method, ion plating method, vacuum deposition method and pulsed laser deposition method may be used. Considering industrial productivity of forming a metal compound layer having a uniform film thickness for a large area, a DC magnetron sputtering method is preferred. Incidentally, a chemical forming method such as chemical vapor deposition (hereinafter referred to as "CVD") and sol-gel method may also be used, other than the above-described physical forming method (PVD). However, a sputtering method is still preferred in view of control of the film thickness.

The target used for sputtering is preferably a metal target. A reactive sputtering method is widely employed, because the oxide of an element used for the metal oxide layer is mostly an insulator, and therefore a DC magnetron sputtering method cannot accommodate in many cases if a metal compound target is used. Also, in recent years, a power source capable of causing two cathodes to simultaneously discharge and thereby suppressing formation of an insulator on a target has been developed, and a pseudo RF magnetron sputtering method is applicable.

In the present invention, when the metal oxide layer is obtained by a DC magnetron sputtering method using a metal target, the layer can be formed by a production method wherein the pressure (back pressure) in a vacuum tank for forming the metal oxide layer is once set to $1.3 \times 10^{-4}$ Pa or less and then an inert gas and oxygen are introduced. When the pressure in a vacuum tank for forming the metal oxide layer is once set to $1.3 \times 10^{-4}$ Pa or less, the effect of molecular species remaining in the vacuum tank and affecting the process of forming the metal oxide layer can be preferably reduced. The pressure in the vacuum tank is more preferably $5 \times 10^{-5}$ Pa or less, still more preferably $2 \times 10^{-5}$ Pa or less.

The inert gas that is subsequently introduced may be, for example, He, Ne, Ar, Kr or Xe. It is suggested that an inert gas having a larger atomic weight gives less damage to the metal oxide layer formed, and enhances the surface flatness. However, considering the cost, Ar is preferred. In order to adjust the concentration of oxygen incorporated into the layer, oxygen may be added to the inert gas at a partial pressure of $1.3 \times 10^{-3}$ to $7 \times 10^{-2}$ Pa. Other than oxygen, $O_3$, $N_2$, $N_2O$, $H_2O$, $NH_3$ or the like may be used according to the purpose.

Furthermore, in the present invention, the metal oxide layer can be formed by a production method wherein the partial pressure of water in a vacuum tank for forming the metal oxide layer is set at $1.3 \times 10^{-4}$ Pa or less, and subsequently an inert gas and oxygen are introduced. The partial pressure of water may be controlled to preferably $4 \times 10^{-5}$ Pa or less, more preferably $2 \times 10^{-5}$ Pa or less. In order to relieve the stress inside of the metal oxide layer by incorporating hydrogen into the film, water may be intentionally introduced at a pressure of $1.3 \times 10^{-4}$ to $3 \times 10^{-2}$ Pa. This adjustment may be performed by once creating a vacuum, and then introducing water with use of a variable leak valve or a mass flow controller. The adjustment may also be performed by controlling the back pressure of the vacuum tank.

In the present invention, the partial pressure of water may be adjusted by using a differential pumping in-process monitor. Also, a quadrupole mass spectrometer having a wide dynamic range and enabling measurement even under a pressure of 0.1 Pa may be used. Furthermore, at a vacuum degree of about $1.3 \times 10^{-5}$ Pa, water mainly causes the pressure. Therefore, the value measured by a vacuum gage may be taken directly as the partial pressure of water.

In the present invention, a polymer film is used as the substrate, and therefore the substrate temperature cannot be raised higher than the softening point of the polymer film when the metal oxide layer is formed. For this reason, in order to form the metal oxide layer, the substrate temperature must be from approximately not more than room temperature to the softening point of the polymer.

In the case of polyethylene terephthalate that is a representative polymer film, unless any special treatment is performed, the metal oxide layer is preferably formed while keeping the substrate temperature at 80° C. or less. The substrate temperature is more preferably 50° C. or less, still more preferably 20° C. or less. Furthermore, from the standpoint of preventing outgassing from the polymer film substrate, the metal oxide layer is preferably formed by setting the substrate temperature to 80° C. or less, more preferably 50° C. or less, still more preferably 20° C. or less.

<Cured Resin Layer>

In the transparent electroconductive laminate of the present invention, a cured resin layer must be provided between the polymer film and the transparent electroconductive layer-1, or between the polymer film and the metal oxide layer.

Examples of the curable resin used as the cured resin layer include an ionizing radiation-curable resin and a thermosetting resin.

Examples of the ionizing radiation-curable resin include the same resins as the ionizing radiation-curable resin exemplified with respect to the transparent electroconductive layer-2.

One of these resins may be used alone, or several resins may be used as a mixture. Also, depending on the case, a hydrolysate of various alkoxysilanes may be added in an appropriate amount. In the case of performing polymerization of the resin layer with ionizing radiation, a known photopolymerization initiator may be added in an appropriate amount. Also, a photosensitizer may be added in an appropriate amount, if desired.

Examples of the photopolymerization initiator include acetophenones, benzophenones, benzoins, benzoyl benzoates and thioxanthones, and examples of the photosensitizer include triethylamine and tri-n-butylphosphine.

As the thermosetting resin, the same resin as the thermosetting/crosslinking resin component constituting the transparent electroconductive layer-2 may be used. Examples thereof include an organosilane-based thermosetting resin using, as a monomer, a silane compound, such as methyltriethoxysilane and phenyltriethoxysilane; a melamine-based thermosetting resin using an etherified methylolmelamine or the like as a monomer; an isocyanate-based thermosetting resin; a phenolic thermosetting resin; and an epoxy-based thermosetting resin. One of these thermosetting resins may be used alone, and a plurality thereof may be used in combination. Also, a thermoplastic resin may be mixed, if desired. Incidentally, in the case of performing crosslinking of the resin layer with heat, a known reaction accelerator or curing agent may be added in an appropriate amount.

Examples of the reaction accelerator include triethylenediamine, dibutyl tin laurate, benzylmethylamine and pyridine. Examples of the curing agent include methylhexahydrophthalic anhydride, 4,4'-diaminodiphenylmethane, 4,4'-diamino-3,3'-diethyldiphenylmethane and diaminodiphenylsulfone.

The lower limit of the thickness of the cured resin layer is not particularly limited. However, in view of flexibility and abrasion resistance, it is preferably 10 μm or less, more preferably 5 μm or less.

In order to further strengthen the adherence between the cured resin layer and the transparent electroconductive layer-1 or metal oxide layer, the cured resin layer may contain a silicon oxide fine particle having an average primary particle diameter of 100 nm or less. Furthermore, when a silicon atom-containing organic compound and a silicon oxide fine particle having an average primary particle diameter of 100 nm or less are used in combination, a cured resin layer having a fine particle of the silicon oxide concentrated in the surface area is obtained, and therefore the effect of improving the adherence above is enhanced. The silicon atom-containing organic compound is a general Si atom-containing surfactant or UV curable resin component. At this time, the content of the silicon oxide fine particle is preferably from 1 to 400 parts by weight, more preferably from 1 to 200 parts by weight, still more preferably from 5 to 100 parts by weight, per 100 parts by weight of the curable resin component.

In the case where both surfaces of the oppositely disposed transparent electroconductive layers constituting a transparent touch panel are flat, a Newton ring is sometimes observed due to interference between reflected light from the movable electrode substrate (upper electrode substrate) of the transparent touch panel and reflected light from the fixed electrode substrate (lower electrode substrate). In order to optically scatter the reflected light to prevent a Newton ring, it is known to make the surface of the transparent electroconductive layer uneven. As a method to form unevenness on the surface of the transparent electroconductive layer, the surface of the cured resin layer can be roughened.

Examples of the method for roughening the surface of cured resin layer include the following methods (1) to (4).

(1) A method of roughening the surface of cured resin layer by producing a cured resin layer comprising a curable resin component, and one fine particle C having an average primary particle diameter of more than 0.1 μm, or two or more fine particles C differing in the average primary particle diameter, wherein at least one fine particle C has an average primary particle diameter of 1.2 times or more of the film thickness of the cured resin layer.

In the case of roughening the surface of cured resin layer by the method (1), the content of the fine particle C contained in the cured resin layer is from 0.1 to 30 parts by weight, preferably from 1 to 20 parts by weight, more preferably from 3 to 15 parts by weight, per 100 parts by weight of the curable resin component. If the content of the fine particle C is less than 0.1 parts by weight, the cured resin layer surface cannot be sufficiently roughened, failing in preventing a Newton ring. On the other hand, if the content of the fine particle C exceeds 30 parts by weight, the haze of the cured resin layer becomes excessively large, as a result, transparency cannot be readily ensured and a screen provided below the transparent touch panel is difficult to be clearly viewed through the transparent touch panel.

(2) A method of roughening the surface of cured resin layer by producing a cured resin layer comprising a curable resin component and one, two or more fine particles D of metal oxide or metal fluoride having an average primary particle diameter of 100 nm or less.

In the case of roughening the surface of cured resin layer by the method (2), the content of the fine particle D contained in the cured resin layer is from 0.1 to 100 parts by weight, preferably from 0.5 to 50 parts by weight, more preferably from 1 to 30 parts by weight, per 100 parts by weight of the curable resin component. If the content of the fine particle D is less than 0.1 parts by weight, the surface of cured resin layer surface cannot be sufficiently roughened, failing in preventing a Newton ring. On the other hand, if the content of the fine particle D exceeds 100 parts by weight, the haze of the cured resin layer becomes excessively large, as a result, transparency cannot be readily ensured and a screen provided below the transparent touch panel is difficult to be clearly viewed through the transparent touch panel.

(3) A method of roughening the surface of cured resin layer by producing a cured resin layer comprising a fine particle C and a fine particle D in combination, together with a curable resin component.

In the case of roughening the surface of cured resin layer surface by the method (3), the contents of the fine particle C and fine particle D contained in the cured resin layer are the same as the contents described above.

In the case of roughening the surface of cured resin layer by the methods (1) to (3) above, the ten-point average roughness (Rz) defined by JIS B0601-1982 is preferably from 100 nm to less than 1,000 nm, more preferably from 100 nm to less than 800 nm, still more preferably from 150 nm to less than 500 nm. If the ten-point average roughness (Rz) is less than 100 nm, a Newton ring sometimes readily occurs between the movable electrode substrate and the fixed electrode substrate of a transparent touch panel. On the other hand, if the ten-point average roughness (Rz) is 1,000 nm or more, this is not preferred, for example, because of the large haze, and when the transparent touch panel is provided on a high-resolution display, color separation in pixels is generated to cause flicker.

The arithmetic average roughness (Ra) defined by JIS B0601-1994 is preferably from 30 nm to less than 500 nm, more preferably from 40 nm to less than 400 nm, still more preferably from 50 nm to less than 300 nm. If the arithmetic average roughness (Ra) is less than 30 nm, a Newton ring sometimes readily occurs between the movable electrode substrate and the fixed electrode substrate of a transparent touch panel. On the other hand, if the arithmetic average roughness (Ra) is 500 nm or more, this is not preferred, for example, because of the large haze, and when the transparent touch panel is provided on a high-resolution display, color separation in pixels is generated to cause flicker.

The haze of the combination of the cured resin layer having roughened surface and the polymer film, as defined by JIS K7136, is from 1% to less than 8%, preferably from 1% to less than 5%, more preferably from 1% to less than 3%. If the haze is less than 1%, a Newton ring sometimes readily occurs between the movable electrode substrate and the fixed electrode substrate of a transparent touch panel, and this is not preferred. On the other hand, if the haze is 8% or more, when the transparent touch panel is provided on a display, the image and character on the display is disadvantageously blurred.

(4) A method of mixing two or more curable resin components and causing phase separation therebetween, and a method of adding a thermoplastic resin component that causes phase separation from the curable resin component. More specifically, a method of not incorporating a fine particle into the cured resin layer to roughen the surface, but causing phase separation of two components to form unevenness, wherein the arithmetic average roughness (Ra) of the cured resin layer according to JIS B0601-1994 is from 0.05 µm to less than 0.5 µm, and the ten-point average roughness (Rz) according to JIS B0601-1982 is from 0.5 µm to less than 2 µm.

In the case of roughening the surface of cured resin layer by the method (4), the components forming the cured resin layer are preferably a polymer as the first component and a monomer as the second component. The difference in the SP value between the first and second components forming the cured resin layer is preferably 0.5 or more. Also, it is preferred that the first component forming the cured resin layer is an unsaturated double bond-containing acrylic copolymer, and the second component is a polyfunctional unsaturated double bond-containing monomer. The components forming the cured resin layer are preferably a silicone-acryl block copolymer and an acrylic copolymer.

When the surface is roughened by this method, the transparent electroconductive laminate of the present invention can achieve a haze of from 1% to less than 20%, as defined by JIS K7136.

More specifically, in the method (4), the cured resin layer has a surface unevenness formed by the phase separation of two components, and does not contain a fine particle for imparting surface unevenness. Once a composition containing the first and second components is coated on a substrate, phase separation of both components occurs due to the difference in the physical properties between the first and second components, and thereby a random unevenness on the surface are obtained. The cured resin layer can be formed by coating the composition on a substrate to form a surface unevenness and then curing the composition. It is preferred that, out of two components forming the cured resin layer, the first component is a polymer and the second component is a monomer.

The first component is preferably a curable polymer excellent in transparency, more preferably a thermosetting polymer or an ionizing radiation-curable polymer. As the polymer, a known polymer may be used, and examples thereof include polymers described in International Patent Publication No. WO2005/073763. The first component is preferably an unsaturated double bond-containing acrylic copolymer (hereinafter, referred to as a "copolymer (1)"). Examples of the copolymer (1) include a copolymer obtained by reacting a monomer having an ethylenically unsaturated double bond and an epoxy group with a resin resulting from polymerization or copolymerization of an acid group-containing polymerizable unsaturated monomer, such as (meth)acryl monomer or with a resin resulting from copolymerization between the resin after polymerization or copolymerization of an acid group-containing polymerizable unsaturated monomer and another unsaturated double bond-containing monomer; and a copolymer obtained by reacting the acid group-containing polymerizable unsaturated monomer with other monomers having an ethylenically unsaturated double bond and an isocyanate group.

Specific examples of the method for preparing the unsaturated double bond-containing acrylic copolymer include a method of copolymerizing an acid group-containing polymerizable unsaturated monomer with other polymerizable unsaturated monomers, and subsequently reacting the acid group of the obtained copolymer with an epoxy group of an epoxy group-containing ethylenically unsaturated monomer.

Example of the acid group-containing polymerizable unsaturated monomer include a monocarboxylic acid such as acrylic acid, methacrylic acid, crotonic acid, 2-(meth)-acryloyloxyethylsuccinic acid, 2-(meth)acryloyloxyethylphthalic acid and 2-(meth)acryloyloxyethylhexahydrophthalic acid; a dicarboxylic acid, such as maleic acid, fumaric acid, citraconic acid, mesaconic acid and itaconic acid; an acid anhydride such as maleic anhydride and itaconic anhydride; a monoester of dicarboxylic acid, such as monoethyl maleate, monoethyl fumarate and monoethyl itaconate, or a substitution derivative thereof produced by substituting the α-position with a haloalkyl, an alkoxy, a halogen, a nitro or a cyano; and an o-, m- or p-vinylbenzoic acid, or a substitution derivative thereof produced by substituting it with an alkyl, an alkoxy, a halogen, a nitro, a cyano, an amide or an ester. One of them may be used alone, or two or more thereof may be used in combination.

Examples of other polymerizable unsaturated monomers include a styrene or a substitution derivative of styrene substituted with an α-, o-, m- or p-alkyl, an alkoxy, a halogen, a haloalkyl, a nitro, a cyano, an amide or an ester; olefins such as butadiene, isoprene and neoprene; an o-, m- or p-hydroxystyrene or a substitution derivative thereof substituted with an alkyl, an alkoxy, a halogen, a haloalkyl, a nitro, a cyano, an amide, an ester or a carboxy; polyhydroxyvinyl phenols, such as vinylhydroquinone, 5-vinylpyroganol, 6-vinylpyrogallol and 1-vinylphloroglucinol; a methyl, ethyl, n-propyl, i-propyl, n-butyl, sec-butyl, tert-butyl, pentyl, neopentyl, isoamylhexyl, cyclohexyl, adamantyl, allyl, propargyl, phenyl, naphthyl, anthracenyl, anthraquinonyl, piperonyl, salicyl, cyclohexyl, benzil, phenethyl, cresyl, glycidyl, isobornyl, triphenylmethyl, dicyclopentanyl, cumyl, 3-(N,N-dimethylamino)propyl, 3-(N,N-dimethylamino)ethyl, furyl or furfuryl ester of a methacrylic or acrylic acid; an anilide or amide of a methacrylic or acrylic acid; N,N-dimethyl, N,N-diethyl, N,N-dipropyl, N,N-diisopropyl or anthranil amide; acrylonitrile; acrolein; methacrylonitrile; vinyl chloride; vinylidene chloride; vinyl fluoride; vinylidene fluoride; N-vinylpyrrolidone; vinylpyridine; vinyl acetate; N-phenylmaleimide; N-(4-hydroxyphenyl)maleimide; N-methacryloylphthalimide; and N-acryloylphthalimide.

Examples of the epoxy-containing ethylenically unsaturated monomer include glycidyl(meth)acrylate, β-methyl glycidyl(meth)acrylate, 3,4-epoxycyclohexanyl (meth)acrylate and 4-hydroxybutyl acrylate glycidyl ether. Use of glycidyl (meth)acrylate is preferred because of a balanced curing property and storage stability thereof.

Specific examples of the method for preparing the unsaturated double bond-containing acrylic copolymer include a method of copolymerizing an epoxy group-containing ethylenically unsaturated monomer with other polymerizable unsaturated monomers, and subsequently reacting the epoxy group of the obtained copolymer with an acid group of an acid group-containing polymerizable unsaturated monomer.

In the present invention, the weight average molecular weight of the unsaturated double bond-containing acrylic copolymer used as the first component is preferably from 500 to 100,000, more preferably 1,000 to 50,000. The "weight average molecular weight" as used in the context of the present invention means a polystyrene-equivalent weight average molecular weight. One of the unsaturated double bond-containing acrylic copolymers may be used alone, or two or more thereof may be used in combination.

The second component is sufficient if it is a monomer undergoing phase separation when mixed with the copolymer (1). The monomer may be a known monomer, and examples thereof include monomers described in International Patent Publication No. WO2005/073763.

The second component is preferably a polyfunctional unsaturated double bond-containing monomer (hereinafter, referred to as a "monomer (2)"). Examples of the monomer (2) include a dealcoholization reaction product of a polyalcohol with a (meth)acrylate. Specific examples thereof include pentaerythritol triacrylate, dipentaerythritol hexa(meth)acrylate, dipentaerythritol penta(meth)acrylate, trimethylolpropane tri(meth)acrylate, ditrimethylolpropane tetra (meth)acrylate and neopentyl glycol di(meth)acrylate. Other than these, an acrylate monomer having a polyethylene glycol skeleton, such as Polyethylene Glycol #200 Diacrylate (produced by Kyoeisha Chemical Co., Ltd.) may also be used. One of these polyfunctional unsaturated double bond-containing monomers may be used alone, or two or more thereof may be used in combination.

It is preferable that, out of two components forming the cured resin layer, the first component is an unsaturated double bond-containing acrylic copolymer, and the second component is a polyfunctional unsaturated double bond-containing monomer.

The components forming the cured resin layer are preferably a silicone-acryl block copolymer and an acrylic copolymer.

The first component and the second component preferably differ from each other in the solubility parameter (SP value). In the case where, as described above, the first component is a copolymer (1) and the second component is a monomer (2), the SP value of the first component (SP1) and the SP value of the second component (SP2) preferably satisfy SP1<SP2. The difference between the SP values of the first and second components is preferably 0.5 or more.

In particular, when the first component is a copolymer (1) and the second component is a monomer (2), the transparent electroconductive laminate of the present invention used in a touch panel preferably achieves no flicker, low haze and remarkably enhanced slide durability and edge-pressing durability.

In the transparent electroconductive laminate of the present invention, the arithmetic average roughness (Ra) according to JIS B0601-1994 of the cured resin layer is from 0.05 µm to less than 0.5 µm, and the ten-point average roughness (Rz) according to JIS B0601-1982 of the cured resin layer is from 0.5 µm to less than 2 µm.

When the transparent electroconductive laminate having Ra and Rz in these ranges is used for a touch panel, the antiglare property, anti-Newton ring property and fingerprint wipability are particularly improved, and flicker is also greatly reduced. In order to further improve these properties, Ra is preferably from 0.1 µm to less than 0.4 µm, more preferably from 0.1 µm to less than 0.35 µm. Also, Rz is preferably from 0.7 µm to less than 1.5 µm, more preferably from 0.7 µm to less than 1.3 µm.

The thickness of the cured resin layer is preferably 10 µm or less. If the thickness exceeds 10 µm, flexibility becomes insufficient, and therefore the touch panel using it may have poor slide durability and edge-pressing durability. In order to further improve these properties, the thickness of the cured resin layer is preferably 8 µm or less, more preferably 6 µm or less.

The cured resin layer can be formed by applying a coating solution containing the first and second components on a polymer film, optionally drying the coating, and curing it by the irradiation of ionizing radiation, a heat treatment or the like. The coating solution preferably contains an organic solvent.

Examples of methods used for forming the cured resin layer include a method using a known coating machine such as doctor knife, bar coater, gravure roll coater, curtain coater, knife coater and spin coater; a spraying method; and a dipping method. The feasible coating methods include a method of dissolving the above-described curable resin component in various organic solvents to obtain a coating solution having an adjusted concentration or viscosity, coating the solution on a transparent organic polymer substrate, and then subjecting the coating to irradiation of radiation, a heat treatment or the like to form the layer.

The organic solvent is preferably an alcohol-based or hydrocarbon-based solvent such as ethanol, isopropyl alcohol, butanol, 1-methoxy-2-propanol, hexane, cyclohexane and ligroin. In particular, it is preferred to use xylene, toluene or ketones such as methyl ethyl ketone and methyl isobutyl ketone. Other than these, a polar solvent, such as cyclohexanone, butyl acetate and isobutyl acetate can also be used. One of these solvents may be used alone, and two or more solvents may be used as a mixed solvent.

For preventing the cured resin layer from deteriorating due to heat or light, an ultraviolet absorber, an antioxidant, an anti-aging agent and the like may also be added.

It is also possible to adjust the optical properties (transmittance and color tone) of the transparent electroconductive laminate by controlling the film thickness or refractive index of the cured resin layer.

In this case, the film thickness of the cured resin layer is preferably from 0.05 to 0.5 μm, more preferably from 0.05 to 0.3 μm.

In order to adjust the refractive index of the cured resin layer, a fine particle D of a metal oxide or metal fluoride having an average primary particle diameter of 100 nm or less, and/or a fluororesin may be added to the cured resin layer. One of them can be used alone, and a plurality thereof can be used in combination. In this case, the refractive index of the cured resin is preferably smaller than the refractive index of the polymer film, and, at the same time, is preferably from 1.20 to 1.55, more preferably from 1.20 to 1.45.

Two or more cured resin layers differing in the material or hardness may be laminated, if desired. Accordingly, it is possible, for example, (A) that a 2.0 μm-thick cured resin layer containing a fine particle C and a fine particle D and having uneven surface is laminated on a polymer film, and then a 0.1 μm-thick low refractive index cured resin layer having a refractive index of 1.4 is laminated on the cured resin layer; and (B) that a 10 μm-thick cured resin layer comprising a rubbery latex mixed therein is formed on a polymer film, and then a 2 μm-thick ultraviolet-curable resin layer composed of a di- to tetra-functional ultraviolet-curable resin is laminated on the rubbery latex layer.

<Cured Resin Layer (Fine Particle C)>

The average primary particle diameter of the fine particle C contained in the cured resin layer is more than 0.1 μm. Specific examples of the fine particle C include an inorganic fine particle, such as a silica fine particle; and an organic fine particle such as crosslinked acrylic fine particle and crosslinked polystyrene fine particle.

<Cured Resin Layer (Fine Particle D)>

The average primary particle diameter of the fine particle D is preferably 100 nm or less, more preferably 75 nm or less, even more preferably 50 nm or less. When the primary particle diameter of the fine particle D is controlled to 100 nm or less, the whitening of coating layer can be prevented.

Examples of the fine particle D include an ultrafine particle of metal oxide or metal fluoride such as $Bi_2O_3$, $CeO_2$, $In_2O_3$, $(In_2O_3 \cdot SnO_2)$, $HfO_2$, $La_2O_3$, $MgF_2$, $Sb_2O_5$, $(Sb_2O_5 \cdot SnO_2)$, $SiO_2$, $SnO_2$, $TiO_2$, $Y_2O_3$, $ZnO$ and $ZrO_2$.

<Optical Interference Layer>

The transparent electroconductive laminate of the present invention may have, between the polymer film or cured resin layer and the transparent electroconductive layer-1 or metal oxide layer, an optical interference layer composed of at least one low refractive index layer and at least one high refractive index layer, wherein the low refractive index layer is in contact with the metal oxide layer or transparent electroconductive layer-1.

As described above, the optical interference layer is composed of at least one low refractive index layer and at least one high refractive index layer. It is also possible to have two or more units of high and low refractive index layers. In the case where the optical interference layer is composed of one high refractive index layer and one low refractive index layer, the film thickness of the optical interference layer is preferably from 30 to 300 nm, more preferably from 50 to 200 nm. The optical interference layer improves the adherence between layers, and the optical properties, particularly transmittance and color tone of the transparent electroconductive laminate.

<Optical Interference Layer (High Refractive Index Layer)>

The high refractive index layer is, for example, a layer formed by hydrolying and condensation-polymerizing a metal alkoxide, or a layer composed of a component obtained by hydrolying and condensation-polymerizing a metal alkoxide and/or a thermosetting resin component and/or an ionizing radiation-curable resin component, and a fine particle D of a metal oxide or metal fluoride having an average primary particle diameter of 100 nm or less.

Examples of the metal alkoxide include a titanium alkoxide, a zirconium alkoxide and an alkoxysilane.

Examples of the titanium alkoxide include titanium tetraisopropoxide, tetra-n-propyl ortho-titanate, titanium tetra-n-butoxide and tetrakis(2-ethylhexyloxy)titanate. Examples of the zirconium alkoxide include zirconium tetraisopropoxide and zirconium tetra-n-butoxide.

Examples of the alkoxysilane include tetramethoxysilane, tetraethoxysilane, methyltrimethoxysilane, methyltriethoxysilane, dimethyldimethoxysilane, γ-glycidoxypropyltrimethoxysilane, β-(3,4-epoxycyclohexyl)ethyltrimethoxysilane, vinyltrimethoxysilane, N-β-(aminoethyl)-γ-aminopropyltrimethoxysilane, N-β-(aminoethyl)-γ-aminopropyldimethoxysilane and γ-aminopropyltriethoxysilane.

In the high refractive index layer, one, two or more fine particles D of metal oxide or metal fluoride having an average primary particle diameter of 100 nm or less may be added in an appropriate amount. The refractive index of the high refractive index layer can be adjusted by the addition of the fine particle D.

In the case of adding the fine particle D in the high refractive index layer, the weight ratio of the fine particle D to the metal alkoxide and/or thermosetting resin and/or ionizing radiation-curable resin is preferably from 0:100 to 66.6:33.3, more preferably from 0:100 to 60:40. If the weight ratio of the fine particle D to the polymer of metal alkoxide and/or thermosetting resin and/or ionizing radiation-curable resin exceeds 66.6:33.3, the strength or adherence required for the optical interference layer may become insufficient, and this is not preferred.

The thickness of the high refractive index layer is preferably from 15 to 250 nm, more preferably from 30 to 150 nm. Also, it is preferred that the refractive index of the high refractive index layer is larger than the refractive indices of the later-described low refractive index layer and the first cured resin layer by 0.2 or more.

<Optical Interference Layer (Low Refractive Index Layer)>

The low refractive index layer constituting the optical interference layer used in the present invention can be formed by using a resin listed as the ionizing radiation-curable resin, thermosetting/crosslinking resin and the like with respect to the transparent electroconductive layer-2. For the purposes of strengthening adherence to the transparent electroconductive layer-1 or metal oxide layer, or adjusting the refractive index, one, two or more fine particles D of metal oxide or metal fluoride having an average primary particle diameter of 100 nm or less may be added to the low refractive index layer in an appropriate amount. The fine particle D used here is suitably a fine particle having a low refractive index, for example a fine particle of $SiO_2$ or $MgF_2$. The thickness of the low refractive index layer is preferably 15 to 250 nm, more preferably from 30 to 150 nm.

<Hardcoat>

In the case where the transparent electroconductive laminate of the present invention is used as a movable electrode substrate, a hardcoat layer is preferably provided on a surface to which an external force is applied when using the touch panel, i.e., a polymer film surface opposite to the surface having the transparent electroconductive layer provided thereon. Examples of the material used for forming the hardcoat layer include an organosilane-based thermosetting resin, such as methyltriethoxysilane and phenyltriethoxysilane; a melamine-based thermosetting resin such as etherified methylolmelamine; and a polyfunctional acrylate-based ultraviolet-curable resin such as polyol acrylate, polyester acrylate; urethane acrylate and epoxy acrylate.

Also, such a material may be used after mixing therein a fine particle of $SiO_2$, $MgF_2$ or the like, if desired. In this case, the fine particles are uniformly dispersed in the hardcoat layer. In view of flexibility and abrasion resistance, the thickness of the hardcoat layer is preferably from 2 to 5 µm.

The hardcoat layer can be formed by a coating method. In the practical coating method, a coating solution is prepared by dissolving the above-described compound in various organic solvents and adjusting the concentration or viscosity, and the obtained coating solution is coated on a transparent organic polymer film, and the coating layer is cured by the irradiation of radiation, a heat treatment or the like. Examples of the coating method include various coating methods, such as a micro gravure coating method, Meyer bar coating method, direct gravure coating method, reverse roll coating method, curtain coating method, spray coating method, comma coating method, die coating method, knife coating method and spin coating method.

Incidentally, the hardcoat layer is laminated on the polymer film directly or via an appropriate anchor layer. Preferred examples of the anchor layer include a layer enhancing the adherence between the hardcoat layer and the polymer film, various phase compensation layers, such as a layer having three-dimensional refractive index characteristics which give a negative K value, a layer preventing permeation of moisture or air or absorbing moisture or air, a layer absorbing an ultraviolet ray or an infrared ray, and a layer reducing the electrostatic propensity of the film.

<Touch Panel>

When, in a touch panel fabricated by disposing transparent electroconductive layers such that they face to one another, the transparent electroconductive laminate of the present invention is used as a transparent electrode substrate, the writing durability, particularly writing durability in edge regions (edge-pressing durability), of the transparent touch panel can be obtained.

For example, FIGS. 1 and 2 illustrate the touch panel of the present invention. In FIGS. 1 and 2, a transparent electroconductive laminate (100 or 200) used as a movable electrode substrate is disposed to face to a fixed electrode substrate (4, 6) having thereon a dot spacer (9). In the fixed electrode substrate (4, 6), a transparent electroconductive layer-1 (4), such as a ITO layer is laminated on one surface of a glass substrate (6), and a dot spacer (9) is disposed thereon.

EXAMPLES

The present invention is described below by referring to specific working examples, but the present invention is not limited thereto. In Examples below, the linearity measuring method, the edge-pressing durability test method, the total light transmittance measuring method, and the environmental reliability evaluating method are as follows.

<Linearity Measuring Method>

A direct current voltage of 5 V is applied between parallel electrodes on a movable electrode substrate or a fixed electrode substrate, and a voltage is measured at intervals of 5 mm in the direction perpendicular to the parallel electrodes. Assuming that the voltage at the measurement start position A is $E_A$, the voltage at the measurement end position B is $E_B$, the actually measured voltage at a distance X from A is $E_X$, the theoretical value is $E_T$, and the linearity is L, the linearity is determined according to following formula:

$$E_T=(E_B-E_A)\times X/(B-A)+E_A$$

$$L(\%)=(|E_T-E_X|)/(E_B-E_A)\times 100$$

<Edge-Pressing Durability Test Method>

A writing durability test is performed by linearly moving a polyacetal-made pen with a tip of 0.8 R back and force 100,000 times under a load of 450 g in parallel to an insulating layer at positions of 2.0 mm and 1.5 mm from the insulating layer formed in the periphery of the movable electrode substrate of the fabricated transparent touch panel, and the change in linearity is measured. If the change in linearity before and after the edge-pressing durability test is 1.5% or more, the sample was judged as "NG".

<Writing Durability (Center Part) Test Method>

A writing durability test is performed by linearly moving a polyacetal-made pen with a tip of 0.8 R back and force 100,000 times under a load of 450 g in the center part of the fabricated transparent touch panel, and the change in linearity is measured. If the change in linearity before and after the writing durability (center part) test is 1.5% or more, the sample was judged as "NG".

<Measurement of Total Light Transmittance>

The total light transmittance was measured by using A300 manufactured by Nippon Denshoku Industries Co., Ltd.

<Evaluation of Environmental Reliability (High-Temperature High-Humidity Reliability)>

The surface resistance value R1 on the transparent electroconductive layer surface of the transparent electroconductive laminate is measured at room temperature. Subsequently, the transparent electroconductive laminate is retained in an environment of 60° C. and 90% RH (relative humidity) for 240 hours, and then taken back to a room, and the surface resistance value R2 on the transparent electroconductive layer surface is measured at room temperature. The ratio of change in the surface resistance value (R2/R1) is calculated from the obtained values of R2 and R1. If the ratio is from 0.8 to 1.2, this reveals that the high-temperature high-humidity reliability is good.

<Evaluation of Environmental Reliability (High-Temperature Reliability)>

The surface resistance value R1 on the transparent electroconductive layer surface of the transparent electroconductive laminate is measured at room temperature. Subsequently, the transparent electroconductive laminate is retained in an environment of 80° C. and Dry (absolute dry) for 240 hours, and then taken back to a room, and the surface resistance value R2 on the transparent electroconductive layer surface is measured at room temperature. The ratio of change in the surface resistance value (R2/R1) is calculated from the obtained values of R2 and R1. If the ratio is from 0.8 to 1.2, this reveals that the high-temperature reliability is good.

<Average Primary Particle Diameter of Fine Particle>

The average primary particle diameter of the fine particle was measured by using a laser diffraction/scattering-type particle size distribution measuring apparatus.

<SP (Solubility Parameter)>

The solubility parameter was calculated according to the method of Van Klevin, which is described in "Properties of Polymers" (Elsevier, Amsterdam (1976)).

<Ra (Arithmetic Average Roughness)>

The arithmetic average roughness was measured by using a stylus surface profiler, DEKTAK3, manufactured by Sloan. The measurement was performed in accordance with JIS B0601-1994.

<Rz (Ten-Point Average Roughness)>

The ten-point average roughness was measured by using Surfcorder SE-3400 manufactured by Kosaka Laboratory Ltd. The measurement was performed in accordance with JIS B0601-1982.

Examples I-1 to I-6, and Comparative Examples I-1 to I-20

In the following Examples I-1 to I-6, and Comparative Examples I-1 to I-20, the embodiment of the present invention which cases the transparent electroconductive layer-2 containing an ionizing radiation-curable resin and a fine particle A of electroconductive metal oxide or metal is studied.

Example I-1

Formation of Hardcoat Layer

On one surface of a 188 μm-thick polyethylene terephthalate film ("OFW", produced by Teijin DuPont Films), a hardcoat layer having a film thickness of 4 μm was formed by using an ultraviolet-curable polyfunctional acrylate resin coating material.

(Formation of Cured Resin Layer)

100 Parts by weight of tetrafunctional acrylate "Aronix" M400 (produced by Toagosei Co., Ltd.), 5 parts by weight of "Irgacure" 184 (produced by Ciba Specialty Chemicals Inc.), and 0.7 parts by weight of "Hipresica" (particle of 3.0 μm (grade: N3N), produced by Ube-Nitto Kasei Co., Ltd.) were dissolved in a 1:1 mixed solvent of isopropyl alcohol and 1-methoxy-2-propanol. Thereafter, to the obtained mixture, an $MgF_2$ ultrafine particle (produced by C.I. Kasei Co., Ltd. (a 20 wt % liquid dispersion in an ethyl alcohol/n-butyl alcohol mixed solvent)) having an average primary particle diameter of 30 nm was added such that a solid content is 5 parts by weight per 100 parts by weight of the curable resin component. In this way, Coating Solution I-A was produced.

On the opposite surface from the hardcoat layer, Coating Solution I-A was coated by a bar coating method to obtain a film thickness of 2.0 μm, dried at 50° C. for 1 minute, and then irradiated with an ultraviolet ray to form a cured resin layer having an uneven surface.

(Formation of Transparent Electroconductive Layer-1)

On the cured resin layer, an ITO layer as the transparent electroconductive layer-1 was formed by a sputtering method. An indium oxide-tin oxide target used in the method has an indium oxide:tin oxide weight ratio of 95:5 and a fill density of 98%. The film thickness of the transparent electroconductive layer-1 formed was about 20 nm, and the surface resistance value after film deposition was about 350 Ω/square (Ω/sq).

(Formation of Transparent Electroconductive Layer-2)

100 Parts by weight of pentaerythritol triacrylate as an ionizing radiation-curable resin, 7 parts by weight of "Irgacure" 184 (produced by Ciba Specialty Chemicals Inc.) as a photopolymerization initiator, and 50 parts by weight (as solid content) of a 15% liquid dispersion (produced by C.I. Kasei Co., Ltd.) obtained by dissolving a crystalline ITO nanoparticle having an average primary particle diameter of 20 nm (produced by C.I. Kasei Co., Ltd.) in toluene were dissolved in a 1:1 (by weight) mixed solvent of isopropyl alcohol and isobutyl alcohol to have a solid content of 5 wt %. In this way, Coating Solution I-B was produced.

Subsequently, Coating Solution I-B produced was coated on the surface of the transparent electroconductive layer-1 by a bar coating method to have a film thickness of about 200 nm, dried at 50° C. for 1 minute and then irradiated with an ultraviolet ray to form a transparent electroconductive layer-2, whereby a transparent electroconductive laminate used as the movable electrode substrate was produced. The surface resistance value after laminating the transparent electroconductive layer-1 and the transparent electroconductive layer-2 was about 270 Ω/square (Ω/sq).

(Movable Electrode Substrate)

The movable electrode substrate produced was heat treated at 150° C. for 90 minutes to crystallize the transparent electroconductive layer-1 (ITO layer). The surface resistance value after crystallization of the ITO layer was about 210 Ω/square (Ω/sq). The environmental reliability of the transparent electroconductive laminate used as the movable electrode substrate are shown in Table I-1. Incidentally, the crystal grain size of the ITO layer observed through TEM was from 50 to 200 nm.

The movable electrode substrate of Example I-1 has a configuration as denoted by number 100 in FIG. 1. In FIG. 1, a cured resin layer (3) having an uneven surface, a transparent electroconductive layer-1 (4) of an ITO layer, and a transparent electroconductive layer-2 (5) containing an ITO nanoparticle are laminated on one surface of a polymer film (2) that is a polyethylene terephthalate film. Further, on another surface of the polymer film (2), a hardcoat layer (1) of an ultraviolet-curable polyfunctional acrylate resin is laminated.

(Production of Fixed Electrode Substrate)

After coating $SiO_2$ on both surfaces of a 1.1 mm-thick glass plate by dip coating, a 18 nm-thick ITO layer was formed in the same manner by a sputtering method. Subsequently, a dot spacer having a height of 7 μm, a diameter of 70 μm and a pitch of 1.5 mm was formed on the ITO layer to produce a fixed electrode substrate.

The fixed electrode substrate of Example I-1 has a configuration as shown in FIG. 1. In FIG. 1, a transparent electroconductive layer-1 (4) of an ITO layer is laminated on one surface of a glass substrate (6), and a dot spacer (9) is disposed thereon.

(Production of Transparent Touch Panel)

A transparent touch panel of FIG. 1 was fabricated by using the fixed electrode substrate and the movable electrode substrate produced above. The transparent touch panel fabricated was subjected to a writing durability test and an edge-pressing durability test. The linearity change before and after the test is shown in Table I-1.

Example I-2

Formation of Metal Oxide Layer

A transparent electroconductive laminate used as the movable electrode substrate was produced in the same manner as in Example I-1, except that an $SiO_x$ layer having a film thickness of about 2.0 nm was formed as a metal oxide layer on the cured resin layer by a sputtering method using an Si target. The environmental reliability of this transparent electroconductive laminate is shown in Table I-1. Incidentally, the crystal grain size of the $SiO_x$ layer observed through TEM was from 50 to 200 nm.

A fixed electrode substrate was produced in the same manner as in Example I-1. Using the produced fixed electrode substrate and movable electrode substrate, a transparent touch panel of FIG. 2 was fabricated. The transparent touch panel fabricated was subjected to a writing durability test and a edge-pressing durability test. The linearity change before and after the test is shown in Table I-1.

Example I-3

Formation of Hardcoat Layer

A hardcoat layer having a film thickness of 4 μm was formed on one surface of a 188 μm-thick polyethylene terephthalate film ("OFW", produced by Teijin DuPont Films) in the same manner as in Example I-1.

(Formation of Cured Resin Layer)

100 Parts by weight of tetrafunctional acrylate "Aronix" M400 (produced by Toagosei Co., Ltd.) and 5 parts by weight of "Irgacure" 184 (produced by Ciba Specialty Chemicals Inc.) were dissolved in a 1:1 mixed solvent of isopropyl alcohol and 1-methoxy-2-propanol to produce Coating Solution I-C.

On the opposite surface from the surface having hardcoat layer, Coating Solution I-C was coated by a bar coating method to have a film thickness of 3.5 μm, dried at 50° C. for 1 minute, and then irradiated with an ultraviolet ray to form a cured resin layer.

(Formation of Metal Oxide Layer)

An $SiO_x$ layer having a film thickness of about 2.0 nm was formed as a metal oxide layer on the cured resin layer by a sputtering method using an Si target.

(Formation of Transparent Electroconductive Layer-1)

On the $SiO_x$ layer as a metal oxide layer, an ITO layer was formed by a sputtering method. An indium oxide-tin oxide target used in the method has an indium oxide:tin oxide weight ratio of 97:3 and a fill density of 98%. The film thickness of the ITO layer formed was about 20 nm, and the surface resistance value after film deposition was about 550 Ω/square (Ω/sq).

(Formation of Transparent Electroconductive Layer-2)

In Coating Solution I-B used in Example I-1, a silicon oxide fine particle having an average primary particle diameter of 0.2 μm was further added in an amount of 1.0 parts by weight per 100 parts by weight of the ionizing radiation-curable resin component to produce Coating Solution I-D.

A transparent electroconductive layer-2 was formed in the same manner as in Example I-1, except for using Coating Solution I-D in place of Coating Solution I-B, and thereby a transparent electroconductive laminate used as the movable electrode substrate was produced.

(Movable Electrode Substrate)

The movable electrode substrate produced was heat treated at 150° C. for 60 minutes to crystallize the transparent electroconductive layer-1 (ITO layer). The surface resistance value after crystallization of the ITO layer was about 370 Ω/square (Ω/sq). The environmental reliability of the transparent electroconductive laminate used as the movable electrode substrate is shown in Table I-1. Incidentally, the crystal grain size of the ITO layer observed through TEM was from 50 to 200 nm.

(Production of Fixed Electrode Substrate)

A fixed electrode substrate was produced in the same manner as in Example I-1.

(Production of Transparent Touch Panel)

A transparent touch panel of FIG. 2 was fabricated by using the fixed electrode substrate and the movable electrode substrate produced above. The transparent touch panel fabricated was subjected to a writing durability test and an edge-pressing durability test. The linearity change before and after the test is shown in Table I-1.

TABLE I-1

|  |  | Example I-1 | Example I-2 | Example I-3 |
|---|---|---|---|---|
| Edge-Pressing Durability | 2.0 mm from edge part | +0.36% | +0.11% | +0.45% |
|  | 1.5 mm from edge part | +0.85% | +0.51% | +0.90% |
| Writing durability (center part) |  | +0.54% | +0.28% | +0.38% |
| Total light transmittance of transparent electroconductive laminate |  | 89.9% | 90.1% | 91.8% |
| 60° C., 90% RH, 240 hr |  | 1.02 | 1.03 | 1.02 |
| 80° C., Dry, 240 hr |  | 1.06 | 1.08 | 1.10 |

Examples I-4 to I-6

Movable electrode substrates and transparent touch panels were produced in the same manner as in Examples I-1 to I-3, except that a cured resin layer used therein does not contain a fine particle to roughen the surface and has a surface unevenness formed by phase separation of two components. The transparent touch panels fabricated were subjected to a writing durability test and an edge-pressing durability test. The linearity change before and after the test is shown in Table I-2.

TABLE I-2

|  |  | Example I-4 | Example I-5 | Example I-6 |
|---|---|---|---|---|
| Edge-Pressing Durability | 2.0 mm from edge part | +0.23% | +0.06% | +0.37% |
|  | 1.5 mm from edge part | +0.56% | +0.39% | +0.88% |
| Writing durability (center part) |  | +0.30% | +0.18% | +0.37% |
| Total light transmittance of transparent electroconductive laminate |  | 90.0% | 89.9% | 89.8% |
| 60° C., 90% RH, 240 hr |  | 1.04 | 1.01 | 1.03 |
| 80° C., Dry, 240 hr |  | 1.08 | 1.05 | 1.08 |

Incidentally, the cured resin layer used in these Examples, i.e. the cured resin layer not containing a fine particle to roughen the surface and having a surface unevenness formed by phase separation of two components, was produced as follows.

Coating Solution X described below was coated by a bar coating method on both surfaces of a 188 μm-thick polyethylene terephthalate (PET) film (OFW, produced by Teijin DuPont Films), dried at 70° C. for 1 minute, and then cured by irradiating an ultraviolet ray thereon to form a 3.5 μm-thick cured resin layer. This cured resin layer had an uneven surface formed by phase separation of two components and did not contain a fine particle for imparting a surface unevenness. Also, the surface roughness of this cured resin layer was Ra=0.125 μm and Rz=0.7 μm.

Coating Solution X was produced by dissolving 4 parts by weight of an unsaturated double bond-containing acrylic copolymer (Sp value: 10.0, Tg: 92° C.) as the first component, 100 parts by weight of pentaerythritol triacrylate (Sp value: 12.7) as the second component, and 7 parts by weight of photopolymerization initiator Irgacure 184 (produced by Ciba Specialty Chemicals Inc.) in an isobutyl alcohol solvent to have a solid content of 40 wt %.

The unsaturated double bond-containing acrylic copolymer (Sp value: 10.0, Tg: 92° C.) was prepared as follows.

A mixture of 171.6 g of isoboronyl methacrylate, 2.6 g of methyl methacrylate and 9.2 g of methylacrylic acid was provided. Simultaneously with 80.0 g of propylene glycol monomethyl ether containing 1.8 g of tertiary-butylperoxy-2-ethylhexanoate, this mixture was added dropwise to 330.0 g of propylene glycol monomethyl ether heated to 110° C. at a constant speed over 3 hours under a nitrogen atmosphere in a 1,000 ml-volume reaction vessel. The reaction vessel was equipped with a stirring blade, a nitrogen inlet tube, a condenser and a dropping funnel. The reaction was then allowed to proceed at 110° C. for 30 minutes.

Thereafter, 17.0 g of a propylene glycol monomethyl ether solution containing 0.2 g of tertiary-butylperoxy-2-ethylhexanoate was added dropwise, and 5.0 g of a propylene glycol monomethyl ether solution containing 1.4 g of tetrabutyl ammonium bromide and 0.1 g of hydroquinone was added. With air bubbling, a solution containing 22.4 g of 4-hydroxybutyl acrylate glycidyl ether and 5.0 g of propylene glycol monomethyl ether was added dropwise over 2 hours, and then the reaction was further allowed to proceed for 5 hours.

An unsaturated double bond-containing acrylic copolymer having a number average molecular weight of 5,500, and a weight average molecular weight of 18,000 was obtained. This resin had the SP value of 10.0, the Tg of 92° C., and the surface tension of 31 dyn/cm.

[Comparative Example I-1]
(Movable Electrode Substrate)

A movable electrode substrate used as the movable electrode substrate was produced in the same manner as in Example I-1, except for not laminating the transparent electroconductive layer-2. The environmental reliability of this transparent electroconductive laminate is shown in Table 1-3. Incidentally, the crystal grain size observed through TEM was from 50 to 200 nm.
(Fixed Electrode Substrate)

A fixed electrode substrate was produced in the same manner as in Example I-1.
(Production of Transparent Touch Panel)

A transparent touch panel of FIG. 3 was fabricated by using the fixed electrode substrate and the movable electrode substrate produced above. The transparent touch panel fabricated was subjected to a writing durability test and an edge-pressing durability test. The linearity change before and after the test is shown in Table 1-3.

Comparative Example I-2

Formation of Hardcoat Layer

A hardcoat layer having a film thickness of 4 μm was formed on one surface of a 188 μm-thick polyethylene terephthalate film ("OFW", produced by Teijin DuPont Films) in the same manner as in Example I-1.
(Formation of Cured Resin Layer)

On the opposite surface from the surface having hardcoat layer, a cured resin layer having an uneven surface was formed by using Coating Solution I-A of Example I-1.
(Formation of Transparent Electroconductive Layer)

On the cured resin layer formed, a transparent electroconductive layer was formed by using a polythiophene-based electroconductive polymer as the material for transparent electroconductive layer to give a surface resistance value of about 500 Ω/square (Ω/sq) after the formation of the transparent electroconductive layer. In this way, a transparent electroconductive laminate used as the movable electrode substrate was produced. The film thickness of the transparent electroconductive layer formed was about 150 nm.

The environmental reliability of the transparent electro conductive laminate used as the movable electrode substrate is shown in Table 1-3.
(Fixed Electrode Substrate)

A fixed electrode substrate was produced in the same manner as in Example I-1. A transparent touch panel of FIG. 4 was fabricated by using the fixed electrode substrate and the movable electrode substrate produced above. The transparent touch panel fabricated was subjected to a writing durability test and an edge-pressing durability test. The linearity change before and after the test is shown in Table 1-3.

Comparative Example I-3

Movable Electrode Substrate

A transparent electroconductive laminate used as the movable electrode substrate was produced in the same manner as in Example I-1, except for laminating a polythiophene-based electroconductive polymer as the transparent electroconductive layer-2. The surface resistance value after laminating the transparent electroconductive layer-1 and the transparent electroconductive layer-2 was about 310 Ω/square (Ω/sq). The transparent electroconductive laminate produced was heat treated at 150° C. for 90 minutes to crystallize the transparent electroconductive layer-1 (ITO layer). The surface resistance value after crystallization of the ITO layer was about 240 Ω/square (Ω/sq).

The environmental reliability of the transparent electroconductive laminate used as the movable electrode substrate is shown in Table 1-3. Incidentally, the crystal grain size observed through TEM was from 50 to 200 nm.
(Fixed Electrode Substrate)

A fixed electrode substrate was produced in the same manner as in Example I-1.
(Transparent Touch Panel)

A transparent touch panel of FIG. 1 was fabricated by using the fixed electrode substrate and the movable electrode substrate produced above. The transparent touch panel fabricated was subjected to a writing durability test and an edge-pressing durability test. The linearity change before and after the test is shown in Table I-3.

TABLE I-3

|  |  | Comparative Example I-1 | Comparative Example I-2 | Comparative Example I-3 |
| --- | --- | --- | --- | --- |
| Edge-Pressing Durability | 2.0 mm from edge part | +3.2% (100 strokes) | No vertical conduction | +0.32% |
|  | 1.5 mm from edge part | +5.1% (100 strokes) |  | +0.77% |

TABLE I-3-continued

|  | Comparative Example I-1 | Comparative Example I-2 | Comparative Example I-3 |
|---|---|---|---|
| Writing durability (center part) | +0.45% |  | +0.48% |
| Total light transmittance of transparent electroconductive laminate | 87.1% | 82.4% | 81.8% |
| 60° C., 90% RH, 240 hr | 1.05 | 1.85 | 1.28 |
| 80° C., Dry, 240 hr | 1.01 | 2.27 | 1.40 |

Comparative Examples I-4 to I-6

Movable Electrode Substrate

In Comparative Examples I-4 to I-6, transparent electroconductive laminates used as the movable electrode substrate were produced in the same manner as in Examples I-1 to I-3, respectively, except that, an amorphous transparent electroconductive film IZO (indium zinc oxide) was used as the transparent electroconductive layer-1. The surface resistance value after forming the IZO layer was about 230 Ω/square (Ω/sq), and the film thickness was about 20 nm. The surface resistance value after laminating the transparent electroconductive layer-2 was about 170 Ω/square (Ω/sq). The environmental reliability of the transparent electroconductive laminate produced is shown in Table I-4. Incidentally, a crystal was not confirmed by the observation through TEM.

(Fixed Electrode Substrate)

A fixed electrode substrate was produced in the same manner as in Example I-1.

(Transparent Touch Panel)

A transparent touch panel of FIGS. 1 and 2 was fabricated by using the fixed electrode substrate and the movable electrode substrate produced above. The transparent touch panel fabricated was subjected to a writing durability test and an edge-pressing durability test. The linearity change before and after the test is shown in Table I-4.

TABLE I-4

|  |  | Comparative Example I-4 | Comparative Example I-5 | Comparative Example I-6 |
|---|---|---|---|---|
| Edge-Pressing Durability | 2.0 mm from edge part | +2.5% (20,000 strokes) | +2.0% (20,000 strokes) | +2.5% (20,000 strokes) |
|  | 1.5 mm from edge part | +4.0% (20,000 strokes) | +3.3% (20,000 strokes) | +4.9% (20,000 strokes) |
| Writing durability (center part) |  | +3.6% (20,000 strokes) | +1.9% (20,000 strokes) | +3.2% (20,000 strokes) |
| Total light transmittance of transparent electroconductive laminate |  | 88.3% | 88.5% | 89.1% |
| 60° C., 90% RH, 240 hr |  | 1.25 | 1.23 | 1.21 |
| 80° C., Dry, 240 hr |  | 1.27 | 1.33 | 1.29 |

Comparative Examples I-7 to I-9

Movable Electrode Substrate

In Comparative Examples I-7 to I-9, transparent electroconductive laminates used as the movable electrode substrate were produced in the same manner as in Examples I-1 to I-3, respectively, except that a cured resin layer was not laminated. In all of the transparent electroconductive laminates produced, the ITO film was whitened due to migration of oligomer components from the PET substrate after a heat treatment for crystallizing the ITO film. Therefore, these could not be used as a transparent electroconductive laminate. Therefore, in Comparative Examples I-7 to I-9, evaluation was no longer performed.

[Comparative Example I-10]

(Movable Electrode Substrate)

A transparent electroconductive laminate used as the movable electrode substrate was produced in the same manner as in Example I-1, except for changing the film thickness of the transparent electroconductive layer-2 to 2.0μm. The environmental reliability of the transparent electroconductive laminate produced is shown in Table 1-5.

(Fixed Electrode Substrate)

A fixed electrode substrate was produced in the same manner as in Example I-1.

(Transparent Touch Panel)

A transparent touch panel of FIG. 1 was fabricated by using the fixed electrode substrate and the movable electrode substrate produced above. The transparent touch panel fabricated was subjected to a writing durability test and an edge-pressing durability test. The linearity change before and after the test is shown in Table I-5.

TABLE I-5

|  |  | Comparative Example I-10 |
|---|---|---|
| Edge-Pressing Durability | 2.0 mm from edge part | No vertical conduction |
|  | 1.5 mm from edge part |  |
| Writing durability (center part) |  |  |
| Total light transmittance of transparent electroconductive laminate |  | 89.5% |
| 60° C., 90% RH, 240 hr |  | 1.11 |
| 80° C., Dry, 240 hr |  | 1.18 |

Comparative Examples I-11 to I-13

Transparent touch panels of Comparative Examples I-11 to I-13 are the same as transparent touch panels of Comparative Examples I-1 to I-3, except that the cured resin layer therein is the same as the cured resin layer of Examples I-4 to I-6, i.e. a cured resin layer not containing a fine particle to roughen the surface and having a surface unevenness formed by phase separation of two components. The transparent touch panels of Comparative Examples I-11 to I-13 were subjected to a writing durability test and an edge-pressing durability test. The linearity change before and after the test is shown in Table I-6.

TABLE I-6

|  |  | Comparative Example I-11 | Comparative Example I-12 | Comparative Example I-13 |
|---|---|---|---|---|
| Edge-Pressing Durability | 2.0 mm from edge part | +2.8% (1,000 strokes) | No vertical conduction | +0.30% |
|  | 1.5 mm from edge part | +4.8% (1,000 strokes) |  | +0.68% |
| Writing durability (center part) |  | +0.30% |  | +0.35% |
| Total light transmittance of transparent electroconductive laminate |  | 86.9% | 81.8% | 83.0% |
| 60° C., 90% RH, 240 hr |  | 1.06 | 1.88 | 1.19 |
| 80° C., Dry, 240 hr |  | 1.03 | 1.98 | 1.33 |

Comparative Examples I-14 to I-20

Transparent touch panels of Comparative Examples I-14 to I-20 are the same as transparent touch panels of Comparative Examples I-4 to I-10, except that the cured resin layer thereof is the same as the cured resin layer of Examples I-4 to I-6, i.e. a cured resin layer not containing a fine particle to roughen the surface and having a surface unevenness formed by phase separation of two components.

The transparent touch panels of Comparative Examples I-14 to I-20 were subjected to a writing durability test and an edge-pressing durability test. The linearity change before and after the test is shown in Tables I-7 and I-8. Incidentally, in all of the transparent electroconductive laminates produced in Comparative Examples I-17 to I-19, the ITO film was whitened due to migration of oligomer components from the PET substrate after a heat treatment for crystallizing the ITO film. These could not be used as a transparent electroconductive laminate. Therefore, in Comparative Examples I-17 to I-19, evaluation was no longer performed.

TABLE I-7

|  |  | Comparative Example I-14 | Comparative Example I-15 | Comparative Example I-16 |
|---|---|---|---|---|
| Edge-Pressing Durability | 2.0 mm from edge part | +2.9% (30,000 strokes) | +2.6% (30,000 strokes) | +3.0% (30,000 strokes) |
|  | 1.5 mm from edge part | +3.9% (30,000 strokes) | +2.9% (30,000 strokes) | +5.7% (30,000 strokes) |
| Writing durability (center part) |  | +4.9% (30,000 strokes) | +2.1% (30,000 strokes) | +6.1% (30,000 strokes) |
| Total light transmittance of transparent electroconductive laminate |  | 87.9% | 88.0% | 88.9% |
| 60° C., 90% RH, 240 hr |  | 1.23 | 1.25 | 1.19 |
| 80° C., Dry, 240 hr |  | 1.29 | 1.30 | 1.31 |

TABLE I-8

|  |  | Comparative Example I-20 |
|---|---|---|
| Edge-Pressing Durability | 2.0 mm from edge part | No vertical conduction |
|  | 1.5 mm from edge part |  |
| Writing durability (center part) |  |  |
| Total light transmittance of transparent electroconductive laminate |  | 89.1% |
| 60° C., 90% RH, 240 hr |  | 1.20 |
| 80° C., Dry, 240 hr |  | 1.17 |

[Evaluation]

As apparent from the results above, the transparent electroconductive laminate of the present invention used as the movable electrode substrate had good performance in all of edge-pressing durability, transparency and environmental reliability. In contrast, the transparent electroconductive laminate of Comparative Example I-1 had poor edge-pressing durability, the transparent electroconductive laminate of Comparative Example I-2 did not have vertical conduction and did not work as a transparent touch panel, and the transparent electroconductive laminate of Comparative Example I-3 had poor transparency.

Examples II-1 to II-3, and Comparative Examples II-1 to II-10

In the following Examples II-1 to II-3 and Comparative Examples II-1 to II-10, the embodiment of the present invention which was the transparent electroconductive layer-2 containing a thermoplastic resin and a fine particle A of electroconductive metal oxide or metal is studied.

Examples II-1 to II-3

In Examples II-1 and II-2, a transparent touch panel was fabricated in the same manner as in Examples I-1 and I-2, respectively, except that, in the formation of the transparent electroconductive layer-2 for an electroconductive laminate that is used as the movable electrode substrate, Coating Solution II-B produced as follows was used in place of Coating Solution I-B.

In Example II-3, a transparent touch panel was fabricated in the same manner as in Example I-3, except that, in the formation of the transparent electroconductive layer-2 for an electroconductive laminate that is used as the movable electrode substrate, a silicon oxide fine particle of 1.0 μm was added to Coating Solution II-B produced as follows in an amount of 1.0 parts by weight per 100 parts by weight of the resin, in place of adding a silicon oxide fine particle of 0.2 μm to Coating Solution I-B in an amount of 1.0 parts by weight per 100 parts by weight of the resin.

Coating Solution II-B was obtained by mixing, in a mixture of toluene and methyl isobutyl ketone at a mixing ratio of 1:1, 100 parts by weight of a polyester resin having a molecular weight of 50,000 (produced by Arakawa Chemical Industries, Ltd.), and 50 parts by weight (as solid content) of a 15% liquid dispersion (produced by C.I. Kasei Co., Ltd.). The liquid dispersion comprised toluene and a crystalline ITO nanoparticle dispersed therein having an average primary particle diameter of 20 nm.

The transparent touch panels fabricated were subjected to a writing durability test and an edge-pressing durability test. The linearity change before and after the test is shown in Table II-1.

TABLE II-1

|  |  | Example II-1 | Example II-2 | Example II-3 |
|---|---|---|---|---|
| Edge-Pressing Durability | 2.0 mm from edge part | +0.57% | +0.41% | +0.40% |
|  | 1.5 mm from edge part | +0.98% | +0.89% | +0.82% |
| Writing durability (center part) |  | +0.54% | +0.51% | +0.50% |
| Total light transmittance of transparent electroconductive laminate |  | 90.4% | 90.9% | 91.0% |
| 60° C., 90% RH, 240 hr |  | 1.05 | 1.07 | 1.08 |
| 80° C., Dry, 240 hr |  | 1.10 | 1.09 | 1.09 |

Comparative Examples II-1 to II-3

Transparent touch panels of Comparative Examples II-1 to II-3 are the same as the transparent touch panels of Comparative Examples I-1 to I-3. The transparent touch panels of Comparative Examples II-1 to II-3 were subjected to a writing durability test and an edge-pressing durability test. For reference, the linearity change before and after the test is shown in Table II-2.

TABLE II-2

|  |  | Comparative Example II-1 | Comparative Example II-2 | Comparative Example II-3 |
|---|---|---|---|---|
| Edge-Pressing Durability | 2.0 mm from edge part | +3.2% (100 strokes) | No vertical conduction | +0.32% |
|  | 1.5 mm from edge part | +5.1% (100 strokes) |  | +0.77% |
| Writing durability (center part) |  | +0.45% |  | +0.48% |
| Total light transmittance of transparent electroconductive laminate |  | 87.1% | 82.4% | 81.8% |
| 60° C., 90% RH, 240 hr |  | 1.05 | 1.85 | 1.28 |
| 80° C., Dry, 240 hr |  | 1.01 | 2.27 | 1.40 |

Comparative Examples II-4 to II-10

Transparent touch panels of Comparative Examples II-4 to II-10 were fabricated by modifying the transparent touch panels of Examples II-1 to II-3 in the same way as modifying the transparent touch panels of Examples I-1 to I-3 in Comparative Examples I-4 to I-10.

The transparent touch panels fabricated were subjected to a writing durability test and an edge-pressing durability test. The linearity change before and after the test is shown in Tables II-3 and II-4. Incidentally, in all of the transparent electroconductive laminates produced in Comparative Examples II-7 to II-9, the ITO film was whitened due to migration of oligomer components from the PET substrate after a heat treatment for crystallizing the ITO film. These could not be used as a transparent electroconductive laminate. Therefore, in Comparative Examples II-7 to II-9, evaluation was no longer performed.

TABLE II-3

|  |  | Comparative Example II-4 | Comparative Example II-5 | Comparative Example II-6 |
|---|---|---|---|---|
| Edge-Pressing Durability | 2.0 mm from edge part | +1.9% (20,000 strokes) | +2.4% (20,000 strokes) | +2.0% (20,000 strokes) |
|  | 1.5 mm from edge part | +3.3% (20,000 strokes) | +2.9% (20,000 strokes) | +5.1% (20,000 strokes) |
| Writing durability (center part) |  | +2.2% (20,000 strokes) | +1.8% (20,000 strokes) | +3.2% (20,000 strokes) |
| Total light transmittance of transparent electroconductive laminate |  | 90.1% | 89.9% | 90.8% |
| 60° C., 90% RH, 240 hr |  | 1.31 | 1.29 | 1.28 |
| 80° C., Dry, 240 hr |  | 1.37 | 1.40 | 1.36 |

TABLE II-4

|  |  | Comparative Example II-10 |
|---|---|---|
| Edge-Pressing Durability | 2.0 mm from edge part | No vertical conduction |
|  | 1.5 mm from edge part |  |
| Writing durability (center part) |  |  |
| Total light transmittance of transparent electroconductive laminate |  | 89.5% |
| 60° C., 90% RH, 240 hr |  | 1.11 |
| 80° C., Dry, 240 hr |  | 1.18 |

[Evaluation]

As apparent from the results above, the transparent electroconductive laminate of the present invention used as the movable electrode substrate had good performance in all of edge-pressing durability, transparency and environmental reliability. In contrast, the transparent electroconductive laminate of Comparative Example II-1 had poor edge-pressing durability, the transparent electroconductive laminate of Comparative Example II-2 had no vertical conduction and did not work as a transparent touch panel, and the transparent electroconductive laminate of Comparative Example II-3 had poor transparency.

Examples III-1 to III-3, and Comparative Examples III-1 to III-10

In the following Examples III-1 to III-3 and Comparative Examples III-1 to III-10, the embodiment of the present invention which was the transparent electroconductive layer-2 containing a thermoplastic resin and a fine particle A of electroconductive metal oxide or metal is studied.

Examples III-1 and III-2

In Examples III-1 and III-2, a transparent touch panel was fabricated in the same manner as in Examples I-1 and I-2, respectively, except that, in the formation of the transparent electroconductive layer-2 for an electroconductive laminate that is used as the movable electrode substrate, Coating Solution III-B produced as follows was used in place of Coating Solution I-B, and the firing time of Coating Solution was changed from 2 minutes to 5 minutes.

Coating Solution III-B was obtained by diluting tetrabutoxy titanate ("B-4" produced by Nippon Soda Co., Ltd.) with a mixed solvent of ligroin (produced by Wako Pure Chemical Industries, Ltd. (guaranteed grade)) and butanol (produced by Wako Pure Chemical Industries, Ltd. (guaranteed grade)), and mixing the diluted solution with 50 parts by weight (as solid content) of a 15% liquid dispersion (produced by C.I. Kasei Co., Ltd.). The liquid dispersion comprises isopropyl alcohol and a ZnO nanoparticle dispersed therein having an average primary particle diameter of 30 nm.

The fabricated transparent touch panels were subjected to a writing durability test and an edge-pressing durability test. The linearity change before and after the test is shown in Table III-1.

TABLE III-1

|  |  | Example III-1 | Example III-2 |
|---|---|---|---|
| Edge-Pressing Durability | 2.0 mm from edge part | +0.66% | +0.59% |
|  | 1.5 mm from edge part | +0.87% | +0.65% |
| Writing durability (center part) |  | +0.56% | +0.49% |
| Total light transmittance of transparent electroconductive laminate |  | 86.8% | 87.3% |
| 60° C., 90% RH, 240 hr |  | 1.11 | 1.09 |
| 80° C., Dry, 240 hr |  | 1.14 | 1.16 |

Comparative Examples III-1 to III-3

Transparent touch panels of Comparative Examples III-1 to III-3 are the same as transparent touch panels of Comparative Examples I-1 to I-3. The transparent touch panels of Comparative Examples III-1 to III-3 were subjected to a writing durability test and an edge-pressing durability test. For reference, the linearity change before and after the test is shown in Table III-2.

TABLE III-2

|  |  | Comparative Example III-1 | Comparative Example III-2 | Comparative Example III-3 |
|---|---|---|---|---|
| Edge-Pressing Durability | 2.0 mm from edge part | +3.2% (100 strokes) | No vertical conduction | +0.32% |
|  | 1.5 mm from edge part | +5.1% (100 strokes) |  | +0.77% |
| Writing durability (center part) |  | +0.45% |  | +0.48% |
| Total light transmittance of transparent electroconductive laminate |  | 87.1% | 82.4% | 81.8% |
| 60° C., 90% RH, 240 hr |  | 1.05 | 1.85 | 1.28 |
| 80° C., Dry, 240 hr |  | 1.01 | 2.27 | 1.40 |

Comparative Examples III-4 to III-8

Transparent touch panels of Comparative Examples III-4 to III-8 were fabricated by modifying the transparent touch panels of Examples III-1 and III-2 in the same way as modifying the transparent touch panels of Examples I-1 and I-2 in Comparative Examples I-4, I-5, I-7 and I-8.

The transparent touch panels fabricated were subjected to a writing durability test and an edge-pressing durability test. The linearity change before and after the test is shown in Tables III-3 and III-4. Incidentally, in the transparent electroconductive laminates produced in Comparative Examples III-6 and III-7, the ITO film was whitened due to migration of oligomer components from the PET substrate after a heat treatment for crystallizing the ITO film. These could not be used as a transparent electroconductive laminate. Therefore, in Comparative Examples III-6 and III-7, evaluation was no longer performed.

TABLE III-3

|  |  | Comparative Example III-4 | Comparative Example III-5 |
|---|---|---|---|
| Edge-Pressing Durability | 2.0 mm from edge part | +2.3% (20,000 strokes) | +3.0% (20,000 strokes) |
|  | 1.5 mm from edge part | +5.8% (10,000 strokes) | +8.8% (10,000 strokes) |
| Writing durability (center part) |  | +4.1% (30,000 strokes) | +3.1% (30,000 strokes) |
| Total light transmittance of transparent electroconductive laminate |  | 85.7% | 86.4% |
| 60° C., 90% RH, 240 hr |  | 1.28 | 1.27 |
| 80° C., Dry, 240 hr |  | 1.30 | 1.35 |

TABLE III-4

|  |  | Comparative Example III-8 |
|---|---|---|
| Edge-Pressing Durability | 2.0 mm from edge part | No vertical conduction |
|  | 1.5 mm from edge part |  |
| Writing durability (center part) |  |  |
| Total light transmittance of transparent electroconductive laminate |  | 85.7% |
| 60° C., 90% RH, 240 hr |  | 1.17 |
| 80° C., Dry, 240 hr |  | 1.18 |

[Evaluation]

As apparent from the results above, the transparent electroconductive laminate of the present invention used as the movable electrode substrate had good performance in all of edge-pressing durability, transparency and environmental reliability. In contrast, the transparent electroconductive laminate of Comparative Example III-1 had poor edge-pressing durability, the transparent electroconductive laminate of Comparative Example III-2 had no vertical conduction and did not work as a transparent touch panel, and the transparent electroconductive laminate of Comparative Example III-3 had poor transparency.

Examples IV-1 to IV-3, and Comparative Examples IV-1 to IV-10

In the following Examples IV-1 to IV-3 and Comparative Examples IV-1 to IV-10, the embodiment of the present invention which uses the transparent electroconductive layer-2 containing a thermosetting/crosslinking resin and a fine particle A of electroconductive metal oxide or metal is studied.

Examples IV-1 to IV-3

In Examples IV-1 and IV-2, a transparent touch panel was fabricated in the same manner as in Examples I-1 and I-2, respectively, except that, in the formation of the transparent electroconductive layer-2 for an electroconductive laminate that is used as the movable electrode substrate, Coating Solution IV-B produced as follows was used in place of Coating Solution I-B, and the firing conditions of Coating Solution were changed from 130° C. and 2 minutes to 150° C. and 10 minutes.

In Example IV-3, a transparent touch panel was fabricated in the same manner as in Example I-3, except that, in the formation of the transparent electroconductive layer-2 for an electroconductive laminate that is used as the movable electrode substrate, a silicon oxide fine particle of 1.0 μm was added to Coating Solution IV-B produced as follows in an amount of 1.0 parts by weight per 100 parts by weight of the resin, in place of adding a silicon oxide fine particle of 0.2 μm to Coating Solution I-B in an amount of 1.0 parts by weight per 100 parts by weight of the resin, and that the firing conditions of Coating Solution were changed from 130° C. and 2 minutes to 150° C. and 10 minutes.

Coating Solution IV-B was obtained by mixing, in a mixture of toluene and methyl isobutyl ketone at a mixing ratio of 1:1, 100 parts by weight of a novolak-based phenol resin having an m-cresol/p-cresol ratio of 6:4, 10 parts by weight of methylolmelamine as a crosslinking agent, and 50 parts by weight (as solid content) of a 15% liquid dispersion (produced by C.I. Kasei Co., Ltd.). The liquid dispersion comprises toluene and a crystalline ITO nanoparticle dispersed therein having an average primary particle diameter of 20 nm.

The transparent touch panels fabricated were subjected to a writing durability test and an edge-pressing durability test. The linearity change before and after the test is shown in Table IV-1.

TABLE IV-1

|  |  | Example IV-1 | Example IV-2 | Example IV-3 |
|---|---|---|---|---|
| Edge-Pressing Durability | 2.0 mm from edge part | +0.47% | +0.40% | +0.39% |
|  | 1.5 mm from edge part | +0.91% | +0.88% | +0.78% |
| Writing durability (center part) |  | +0.50% | +0.43% | +0.40% |
| Total light transmittance of transparent electroconductive laminate |  | 89.7% | 90.9% | 89.9% |

TABLE IV-1-continued

|  | Example IV-1 | Example IV-2 | Example IV-3 |
|---|---|---|---|
| 60° C., 90% RH, 240 hr | 1.10 | 1.05 | 1.09 |
| 80° C., Dry, 240 hr | 1.13 | 1.15 | 1.10 |

Comparative Examples IV-1 to IV-3

Transparent touch panels of Comparative Examples IV-1 to IV-3 are the same as transparent touch panels of Comparative Examples I-1 to I-3. The transparent touch panels of Comparative Examples IV-1 to IV-3 were subjected to a writing durability test and an edge-pressing durability test. For reference, the linearity change before and after the test is shown in Table IV-2.

TABLE IV-2

|  |  | Comparative Example IV-1 | Comparative Example IV-2 | Comparative Example IV-3 |
|---|---|---|---|---|
| Edge-Pressing Durability | 2.0 mm from edge part | +3.2% (100 strokes) | No vertical conduction | +0.32% |
|  | 1.5 mm from edge part | +5.1% (100 strokes) |  | +0.77% |
| Writing durability (center part) |  | +0.45% |  | +0.48% |
| Total light transmittance of transparent electroconductive laminate |  | 87.1% | 82.4% | 81.8% |
| 60° C., 90% RH, 240 hr |  | 1.05 | 1.85 | 1.28 |
| 80° C., Dry, 240 hr |  | 1.01 | 2.27 | 1.40 |

Comparative Examples IV-4 to IV-10

Transparent touch panels of Comparative Examples IV-4 to IV-10 were fabricated by modifying the transparent touch panels of Examples IV-1 to IV-3 in the same way as modifying the transparent touch panels of Examples I-1 to I-3 in Comparative Examples I-4 to I-10.

The transparent touch panels fabricated were subjected to a writing durability test and an edge-pressing durability test. The linearity change before and after the test is shown in Tables IV-3 and IV-4. Incidentally, in all of the transparent electroconductive laminates produced in Comparative Examples IV-7 to IV-9, the ITO film was whitened due to migration of oligomer components from the PET substrate after a heat treatment for crystallizing the ITO film. These could not be used as a transparent electroconductive laminate. Therefore, in Comparative Examples IV-7 to IV-9, evaluation was no longer performed.

TABLE IV-3

|  |  | Comparative Example IV-4 | Comparative Example IV-5 | Comparative Example IV-6 |
|---|---|---|---|---|
| Edge-Pressing Durability | 2.0 mm from edge part | +1.9% (20,000 strokes) | +2.4% (20,000 strokes) | +2.0% (20,000 strokes) |
|  | 1.5 mm from edge part | +3.3% (20,000 strokes) | +2.9% (20,000 strokes) | +5.1% (20,000 strokes) |
| Writing durability (center part) |  | +2.2% (20,000 strokes) | +1.8% (20,000 strokes) | +3.2% (20,000 strokes) |

TABLE IV-3-continued

|  | Comparative Example IV-4 | Comparative Example IV-5 | Comparative Example IV-6 |
|---|---|---|---|
| Total light transmittance of transparent electroconductive laminate | 90.1% | 89.9% | 90.8% |
| 60° C., 90% RH, 240 hr | 1.31 | 1.29 | 1.28 |
| 80° C., Dry, 240 hr | 1.37 | 1.40 | 1.36 |

TABLE IV-4

|  |  | Comparative Example IV-10 |
|---|---|---|
| Edge-Pressing Durability | 2.0 mm from edge part | No vertical conduction |
|  | 1.5 mm from edge part |  |
| Writing durability (center part) |  |  |
| Total light transmittance of transparent electroconductive laminate |  | 89.5% |
| 60° C., 90% RH, 240 hr |  | 1.11 |
| 80° C., Dry, 240 hr |  | 1.18 |

[Evaluation]

As apparent from the results above, the transparent electroconductive laminate of the present invention used as the movable electrode substrate had good performance in all of edge-pressing durability, transparency and environmental reliability. In contrast, the transparent electroconductive laminate of Comparative Example IV-1 had poor edge-pressing durability, the transparent electroconductive laminate of Comparative Example IV-2 had no vertical conduction and did not work as a transparent touch panel, and the transparent electroconductive laminate of Comparative Example IV-3 had poor transparency.

The invention claimed is:

1. A transparent electroconductive laminate, comprising a polymer film having, on at least one surface thereof, a cured resin layer, a transparent electroconductive layer-1 and a transparent electroconductive layer-2 laminated in that order, wherein said transparent electroconductive layer-1 is a crystalline transparent electroconductive layer containing no organic component; and the transparent electroconductive layer-2 contains an ionizing radiation-curable resin, a thermoplastic resin, a polymer of a metal alkoxide other than alkoxysilane, or a thermosetting/crosslinking resin, and at least one fine particle A of electroconductive metal oxide or metal having an average primary particle diameter of 100 nm or less.

2. The transparent electroconductive laminate according to claim 1, wherein the content of the fine particle A is from 0.1 to 400 parts by weight per 100 parts by weight of the ionizing radiation-curable resin, the thermoplastic resin, the polymer of a metal alkoxide other than alkoxysilane, or the thermosetting/crosslinking resin.

3. The transparent electroconductive laminate according to claim 1, wherein the film thickness of the transparent electroconductive layer-1 is from 5 to 50 nm.

4. The transparent electroconductive laminate according to claim 1, wherein the film thickness of the transparent electroconductive layer-2 is from 10 to 1,500 nm.

5. The transparent electroconductive laminate according to claim 1, wherein the transparent electroconductive layer-2 contains a fine particle B, an average primary particle diameter of the fine particle B being 1.2 times or more of the film thickness of said transparent electroconductive layer-2, and the average primary particle diameter of the fine particle B being 1.2 μm or less.

6. The transparent electroconductive laminate according to claim 5, wherein the fine particle B is a fine particle of electroconductive metal oxide or metal.

7. The transparent electroconductive laminate according to claim 1, wherein the laminate further has a metal oxide layer having a film thickness of 0.5 nm to less than 5.0 nm between the cured resin layer and the transparent electroconductive layer-1.

8. The transparent electroconductive laminate according to claim 1, wherein the cured resin layer has a refractive index of 1.20 to 1.55 and a film thickness of 0.05 to 0.5 μm.

9. The transparent electroconductive laminate according to claim 1, wherein the cured resin layer has an uneven surface, and contains a curable resin component and one, two or more fine particles C having an average primary particle diameter of more than 0.1 μm, and the average primary particle diameter of at least one fine particle C is 1.2 times or more of the film thickness of the cured resin layer.

10. The transparent electroconductive laminate according to claim 1, wherein the cured resin layer has an uneven surface, and contains a curable resin component and one, two or more fine particles D of metal oxide or metal fluoride having an average primary particle diameter of 100 nm or less.

11. The transparent electroconductive laminate according to claim 9, wherein the cured resin layer contains a curable resin component, a fine particle C, and a fine particle D.

12. The transparent electroconductive laminate according to claim 1, wherein the cured resin layer has an uneven surface formed by phase separation of two components, and does not contain a particle for imparting a surface unevenness, the arithmetic average roughness (Ra) according to JIS B0601-1994 of the cured resin layer is from 0.05 μm to less than 0.5 μm, and the ten-point average roughness (Rz) according to JIS B0601-1982 of the cured resin layer is from 0.5 μm to less than 2 μm.

13. The transparent electroconductive laminate according to claim 12, wherein the components forming the cured resin layer are a polymer as a first component and a monomer as a second component.

14. The transparent electroconductive laminate according to claim 12, wherein the difference between solubility parameter values of the first and second components forming the cured resin layer is 0.5 or more.

15. The transparent electroconductive laminate according to claim 12, wherein the first component forming the cured resin layer is an, unsaturated double bond-containing acrylic copolymer, and the second component is a polyfunctional unsaturated double bond-containing monomer.

16. The transparent electroconductive laminate according to claim 1, wherein the laminate has an optical interference layer comprising at least one low refractive index layer and at least one high refractive index layer between the polymer film and the transparent electroconductive layer-1, and the low refractive index layer is in contact with the transparent electroconductive layer-1.

17. The transparent electroconductive laminate according to claim 1, wherein the laminate has an optical interference layer comprising at least one low refractive index layer and at least one high refractive index layer between the polymer film and the metal oxide layer, and the low refractive index layer is in contact with the metal oxide layer.

18. A touch panel, wherein two transparent electrode substrates each having, on at lease one surface thereof, a transparent electroconductive layer are disposed such that the transparent electroconductive layers face to each other, and wherein the transparent electroconductive laminate according to claim 1 is used as at least one of the transparent electrode substrate.

* * * * *